(12) United States Patent
Da et al.

(10) Patent No.: US 11,695,525 B2
(45) Date of Patent: Jul. 4, 2023

(54) METHOD AND DEVICE FOR TRANSMITTING POSITIONING REFERENCE SIGNAL

(71) Applicant: China Academy of Telecommunications Technology, Beijing (CN)

(72) Inventors: Ren Da, Beijing (CN); Fang-Chen Cheng, Beijing (CN); Hui Li, Beijing (CN); Qiubin Gao, Beijing (CN); Xueyuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 93 days.

(21) Appl. No.: 17/045,509

(22) PCT Filed: Mar. 28, 2019

(86) PCT No.: PCT/CN2019/080137
§ 371 (c)(1),
(2) Date: Oct. 6, 2020

(87) PCT Pub. No.: WO2019/196666
PCT Pub. Date: Oct. 17, 2019

(65) Prior Publication Data
US 2021/0126754 A1    Apr. 29, 2021

(30) Foreign Application Priority Data

Apr. 9, 2018    (CN) .......................... 201810311640.2

(51) Int. Cl.
*H04W 72/04*    (2023.01)
*H04L 5/00*    (2006.01)
(Continued)

(52) U.S. Cl.
CPC .......... *H04L 5/0048* (2013.01); *H04L 5/0007* (2013.01); *H04W 72/0446* (2013.01); *H04W 72/0453* (2013.01)

(58) Field of Classification Search
CPC ... H04L 5/0048; H04L 5/0007; H04L 27/261; H04L 27/26025; H04L 5/0082;
(Continued)

(56) References Cited

U.S. PATENT DOCUMENTS 11,343,818 B2 *   5/2022   Wang ...................... H04L 5/005
2018/0048444 A1 *  2/2018   Park ....................... H04L 5/0053
(Continued)

FOREIGN PATENT DOCUMENTS

CN    101616360 A    12/2009
CN    101778068 A    7/2010
(Continued)

OTHER PUBLICATIONS

3GPP TR 21.914 V0.5.0, 3rd Generation Partnership Project;Technical Specification Group Services and System Aspects;Release 14 Description;Summary of Rel-14 Work Items, total 106 pages, Aug. 2017.
(Continued)

*Primary Examiner* — Jae Y Lee
*Assistant Examiner* — Aixa A Guadalupe Cruz
(74) *Attorney, Agent, or Firm* — Kilpatrick Townsend & Stockton, LLP

(57) ABSTRACT

Disclosed are a method and device for transmitting a positioning reference signal. In the method, a base station maps, according to configuration information of a PRS, a PRS sequence to a time-frequency resource for sending a PRS; and the base station sends the configuration information of the PRS to a terminal, and sends the mapped PRS on the time-frequency resource for sending a PRS.

18 Claims, 6 Drawing Sheets

(51) Int. Cl.
*H04W 72/0446* (2023.01)
*H04W 72/0453* (2023.01)

(58) Field of Classification Search
CPC .......... H04L 27/2613; H04W 72/0446; H04W 72/0453; H04W 72/042; H04W 64/00; H04W 72/04; H04W 72/0406
See application file for complete search history.

(56) References Cited

U.S. PATENT DOCUMENTS

| | | | |
|---|---|---|---|
| 2018/0049149 A1* | 2/2018 | Lee | H04W 24/10 |
| 2018/0049151 A1 | 2/2018 | Yoon et al. | |
| 2018/0098187 A1* | 4/2018 | Blankenship | H04L 27/2602 |
| 2018/0124787 A1* | 5/2018 | Wang | G01S 5/0226 |
| 2021/0250892 A1* | 8/2021 | Kim | H04L 5/0048 |

FOREIGN PATENT DOCUMENTS

| | | |
|---|---|---|
| CN | 104010363 A | 8/2014 |
| CN | 104469931 A | 3/2015 |
| CN | 104756432 A | 7/2015 |
| CN | 107465497 A | 12/2017 |
| CN | 107690787 A | 2/2018 |
| WO | 2016163943 A1 | 10/2016 |
| WO | 2018064537 A1 | 4/2018 |

OTHER PUBLICATIONS

3GPP TR 38.912 V1.0.0, 3rd Generation Partnership Project; Technical Specification Group Radio Access Network; Study on New Radio (NR) Access Technology; Release 14, total 74 pages, Mar. 2017.

ITL,"Support of OTDOA in NB-IoT", 3GPP TSG RAN WG1 Meeting #86, Gothenburg, Sweden Aug. 22-26, 2016, total 9 pages, R1-167752.

3GPP, TS 36.211 v15.1.0, Evolved Universal Terrestrial Radio Access (E-UTRA); Physical channels and modulation, total 44 pages, Mar. 2018.

* cited by examiner

METHOD AND DEVICE FOR TRANSMITTING POSITIONING REFERENCE SIGNAL

The present application is a National Stage of International Application No. PCT/CN2019/080137 filed Mar. 28, 2019, which claims the priority of Chinese patent application No. 201810311640.2, filed with the Chinese Patent Office on Apr. 9, 2018 and entitled "METHOD AND DEVICE FOR TRANSMITTING POSITIONING REFERENCE SIGNAL", which is hereby incorporated by reference in its entirety.

FIELD

The present application relates to the technical field of wireless communication, in particular to a method and device for transmitting a positioning reference signal.

BACKGROUND

Observed time difference of arrival (OTDOA) is a method introduced by 3GPP for positioning through measured downlink reference signal time differences. According to the method, a terminal (also called user equipment (UE)) measures reference signals from a serving cell and neighboring cells to obtain reference signal time difference measurement (RSTD), and reports the RSTD to a network positioning server, and the network positioning server determines the location of the user equipment through a multi-point positioning algorithm or other algorithms according to the RSTD.

In principle, the user equipment can use any downlink reference signal, for example, a primary synchronization signal (PSS) and/or a secondary synchronization signal (SSS) in a new radio (NR) access technology, or a PSS and/or a SSS in a long term evolution (LTE) system to obtain RSTD for supporting OTDOA. In order to provide good OTDOA positioning performance, the user equipment needs to detect a sufficient number of downlink reference signals from neighboring cells.

A feasible method is to define positioning reference signals (PRS) In one embodiment supporting OTDOA. However, for a 5G-NR system, the PRSs supporting OTDOA and a transmitting scheme of the PRSs have not yet been defined.

SUMMARY

Embodiments of the present application provide a method and device for transmitting a positioning reference signal.

In a first aspect, an embodiment of the present application provides a method for transmitting a positioning reference signal, and the method includes:

mapping, by a base station, according to configuration information of the PRS, a PRS sequence to a time-frequency resource for sending the PRS;

sending, by the base station, the configuration information of the PRS to a terminal; and sending, by the base station, a mapped PRS on the time-frequency resource for sending the PRS.

In one embodiment, the configuration information of the PRS includes a PRS resource element (RE) density configuration parameter, and the PRS RE density configuration parameter is configured to indicate a quantity of REs for sending the PRS in PRS resource blocks (RB).

In one embodiment, the configuration information of the PRS includes PRS frequency domain resource indication information, and the PRS frequency domain resource indication information includes a start of a downlink resource grid, a start of a PRS bandwidth, the PRS bandwidth, PRS amplitude scaling and PRS RE frequency shift indication information.

In one embodiment, the PRS RE frequency shift indication information includes a sequence number of symbols adopted by the PRS, a PRS sequence identity and a PRS RE density configuration parameter.

In one embodiment, the configuration information of the PRS includes PRS time domain resource indication information, and the PRS time domain resource indication information includes slot configuration information in PRS subframes and/or symbol configuration information in PRS slots; and the slot configuration information in the PRS subframes is configured to indicate slots for sending the PRS in the PRS subframes, and the symbol configuration information in the PRS slots is configured to indicate symbols for sending the PRS in the PRS slots.

In one embodiment, a bitmap serves as the slot configuration information in the PRS subframes, and the bitmap includes $2^\mu$ bits, and each bit corresponds to a slot in the PRS subframes. When the bits in the bitmap are set to a specified value, the slots corresponding to the bits set to the specified value are configured to send the PRS; and $\mu$ is equal to one of 0, 1, 2, 3 and 4.

In one embodiment, a bitmap serves as the symbol configuration information in the PRS slots, the bitmap includes $N_{symble}^{slot}$ bits, and each bit corresponds to a symbol in the PRS slots. When the bits in the bitmap are set to a specified value, the symbols corresponding to the bits set to the specified value are configured to send the PRS, and $N_{symble}^{slot}$ represents a quantity of symbols in a slot; or the symbol configuration information in the PRS slots is a PRS symbol configuration index in a symbol list, the symbol list includes N PRS symbol configuration indexes, each PRS symbol configuration index is configured to indicate symbols for sending the PRS in the PRS slots, and a length of the symbol list is $\log_2(N)$ bits, and N is an integer greater than or equal to 1.

In one embodiment, the PRS sequence is mapped to the frequency domain resource for sending the PRS according to a following formula:

$$a_{k,l}^{(p,\mu)} = \beta_{PRS} r_{l,n_{s,f}}(n');$$

and:

$$k = (n + N_{PRS}^{start,\mu} + N_{grid,DL}^{start,\mu}) \times N_{SC}^{RB} + \frac{N_{SC}^{RB}}{c_{PRS}} k' + v_{shift};$$

$$v_{shift} = (l + N_{ID}^{PRS}) \bmod \left(\frac{N_{SC}^{RB}}{c_{PRS}}\right);$$

$$n' = c_{PRS} \times (n + N_{PRS}^{start,\mu}) + k';$$

$$n = 0, 1, \ldots, N_{RB}^{PRS} - 1;$$

$$k' = 0, 1, \ldots, c_{PRS} - 1;$$

In one embodiment, a reference of k is a subcarrier 0 in a common resource block 0 in a common resource block grid, $N_{grid,DL}^{start,\mu}$ represents a start of a downlink resource grid, $N_{PRS}^{start,\mu}$ represents a start of a PRS bandwidth, $N_{RB}^{PRS}$ represents the PRS bandwidth, $\beta_{PRS}$ represents PRS amplitude scaling, $v_{shift}$ represents PRS RE frequency shift, l represents a sequence number of orthogonal frequency division multiplexing (OFDM) symbols adopted by the PRS, $N_{ID}^{PRS}$ represents a PRS sequence identity, $N_{SC}^{RB}$ represents a quantity of subcarriers in each PRS RB, $c_{PRS}$ represents a PRS RE density configuration parameter, and $\gamma_{l,n_{s,f}}(n')$ represents the PRS sequence with an OFDM symbol sequence number of l in a slot $n_{s,f}$.

In one embodiment, the PRS sequence is generated according to a pseudo-random sequence, a size of the downlink resource grid, and the PRS RE density configuration parameter; and an initial value of the pseudo-random sequence is generated according to a sequence number of slots adopted by the PRS, a sequence number of symbols in corresponding slots, and a PRS sequence identity.

In one embodiment, the initial value of the pseudo-random sequence is:

$$c_{init} = \left\{ 2^{28+\mu} \times \left\lfloor \frac{N_{ID}^{PRS}}{1024} \right\rfloor + 2^{10} \times (14 \times (n_{s,f}^{\mu}+1)+l+1) \times (N_{ID}^{PRS} \bmod 1024 + 1) + (N_{ID}^{PRS} \bmod 1024) \right\} \bmod 2^{31};$$

In one embodiment, represents the initial value of the pseudo-random sequence; $n_{s,f}^{\mu}$ represents a slot sequence number within a radio frame for subcarrier spacing configuration u, $\mu$ represents a subcarrier spacing configuration parameter, and $\mu \in \{0,1,2,3,4\}$; l represents a sequence number of OFDM symbols within a slot $n_{s,f}^{\mu}$; and $N_{ID}^{PRS}$ represents the PRS sequence identity.

In one embodiment, the initial value of the pseudo-random sequence is:

$$c_{init}=(2^{16} \times (14 \times n_{s,f}^{\mu}+l+1) \times (2N_{ID}^{PRS}+1)+N_{ID}^{PRS}) \bmod 2^{31};$$

In one embodiment, $c_{init}$ represents the initial value of the pseudo-random sequence; $n_{s,f}^{\mu}$ represents a slot sequence number within a radio frame for subcarrier spacing configuration $\mu$, $\mu$ represents a subcarrier spacing configuration parameter, and $\mu \in \{0,1,2,3,4\}$; l represents a sequence number of OFDM symbols within a slot $n_{s,f}^{\mu}$; and $N_{ID}^{PRS}$ represents the PRS sequence identity.

In one embodiment, the subcarrier spacing of PRSs is $\Delta f_{PRS}=15 \times 2^{\mu}$ kHz, and $\mu$ is equal to one of 0, 1, 2, 3 and 4.

In a second aspect, an embodiment of the present application provides a method for transmitting a positioning reference signal, and the method includes:

obtaining, by a terminal, configuration information of a positioning reference signal (PRS); and receiving, by the terminal, the PRS on a time-frequency resource for sending the PRS according to the configuration information of the PRS, and the PRS is sent by a base station.

In one embodiment, the configuration information of the PRS includes a PRS RE density configuration parameter, and the PRS RE density configuration parameter is configured to indicate a quantity of REs for sending the PRS in PRS RBs.

In one embodiment, the configuration information of the PRS includes PRS frequency domain resource indication information, and the PRS frequency domain resource indication information includes a start of a downlink resource grid, a start of a PRS bandwidth, the PRS bandwidth, PRS amplitude scaling and PRS RE frequency shift indication information.

In one embodiment, the PRS RE frequency shift indication information includes a sequence number of symbols adopted by the PRS, a PRS sequence identity and a PRS RE density configuration parameter.

In one embodiment, the configuration information of the PRS includes PRS time domain resource indication information, and the PRS time domain resource indication information includes slot configuration information in PRS subframes and/or symbol configuration information in PRS slots; and the slot configuration information in the PRS subframes is configured to indicate slots for sending the PRS in the PRS subframes, and the symbol configuration information in the PRS slots is configured to indicate symbols for sending the PRS in the PRS slots.

In one embodiment, a bitmap serves as the slot configuration information in the PRS subframes, and the bitmap includes $2^{\mu}$ bits, and each bit corresponds to a slot in the PRS subframes. When the bits in the bitmap are set to a specified value, the slots corresponding to the bits set to the specified value are configured to send the PRS; and $\mu$ is equal to one of 0, 1, 2, 3 and 4.

In one embodiment, a bitmap serves as the symbol configuration information in the PRS slots, the bitmap includes $N_{symble}^{slot}$ bits, and each bit corresponds to a symbol in the PRS slots. When the bits in the bitmap are set to a specified value, the symbols corresponding to the bits set to the specified value are configured to send the PRS, and $N_{symble}^{slot}$ represents a quantity of symbols in a slot; or the symbol configuration information in the PRS slots is a PRS symbol configuration index in a symbol list, the symbol list includes N PRS symbol configuration indexes, each PRS symbol configuration index is configured to indicate symbols for sending the PRS in the PRS slots, and a length of the symbol list is $\log_2(N)$ bits, and N is an integer greater than or equal to 1.

In one embodiment, the PRS sequence is mapped to the frequency domain resource for sending the PRS according to the following formula:

$$a_{k,l}^{(p,\mu)}=\beta_{PRS}\gamma_{l,n_{s,f}}(n');$$

and:

$$k = (n + N_{PRS}^{start,\mu} + N_{grid,DL}^{start,\mu}) \times N_{SC}^{RB} + \frac{N_{SC}^{RB}}{c_{PRS}}k' + v_{shift};$$

$$v_{shift} = (l + N_{ID}^{PRS}) \bmod \left(\frac{N_{SC}^{RB}}{c_{PRS}}\right);$$

$$n' = c_{PRS} \times (n + N_{PRS}^{start,\mu}) + k';$$

$$n = 0, 1, \ldots, N_{RB}^{PRS} - 1;$$

$$k' = 0, 1, \ldots, c_{PRS} - 1;$$

In one embodiment, a reference of k is a subcarrier 0 in a common resource block 0 in a common resource block grid, $N_{grid,DL}^{start,\mu}$ represents a start of a downlink resource grid, $N_{PRS}^{start,\mu}$ represents a start of a PRS bandwidth, $N_{RB}^{PRS}$ represents the PRS bandwidth, $\beta_{PRS}$ represents PRS amplitude scaling, $v_{shift}$ represents PRS RE frequency shift, l represents a sequence number of orthogonal frequency division multiplexing (OFDM) symbols adopted by the PRS, $N_{ID}^{PRS}$ represents a PRS sequence identity, $N_{SC}^{RB}$ represents a quantity of subcarriers in each PRS RB, $c_{PRS}$ represents a PRS RE density configuration parameter, and $\gamma_{l,n_{s,f}}(n')$ represents the PRS sequence with an OFDM symbol sequence number of l in a slot $n_{s,f}$.

In one embodiment, the PRS sequence is generated according to a pseudo-random sequence, a size of the downlink resource grid, and the PRS RE density configuration parameter; and an initial value of the pseudo-random sequence is generated according to a sequence number of slots adopted by the PRS, a sequence number of symbols in corresponding slots, and a PRS sequence identity.

In one embodiment, the initial value of the pseudo-random sequence is:

$$c_{init} = \left\{ 2^{28+\mu} \times \left\lfloor \frac{N_{ID}^{PRS}}{1024} \right\rfloor + 2^{10} \times (14 \times (n_{s,f}^{\mu} + 1) + l + 1) \times (N_{ID}^{PRS} \bmod 1024 + 1) + (N_{ID}^{PRS} \bmod 1024) \right\} \bmod 2^{31};$$

In one embodiment, $c_{init}$ represents the initial value of the pseudo-random sequence; $n_{s,f}^{\mu}$ represents a slot sequence number within a radio frame for subcarrier spacing configuration $\mu$, $\mu$ represents a subcarrier spacing configuration parameter, and $\mu \in \{0,1,2,3,4\}$; l represents a sequence number of OFDM symbols within a slot $n_{s,f}^{\mu}$; and $N_{ID}^{PRS}$ represents the PRS sequence identity.

In one embodiment, the initial value of the pseudo-random sequence is:

$$c_{init} = (2^{16} \times (14 \times n_{s,f}^{\mu} + l + 1) \times (2N_{ID}^{PRS} + 1) + N_{ID}^{PRS}) \bmod 2^{31};$$

In one embodiment, $c_{init}$ represents the initial value of the pseudo-random sequence; $n_{s,f}^{\mu}$ represents a slot sequence number within a radio frame for subcarrier spacing configuration $\mu$, $\mu$ represents a subcarrier spacing configuration parameter, and $\mu \in \{0,1,2,3,4\}$; l represents a sequence number of OFDM symbols within a slot $n_{s,f}^{\mu}$; and $N_{ID}^{PRS}$ represents the PRS sequence identity.

In one embodiment, the subcarrier spacing of PRSs is $\Delta f_{PRS} = 15 \times 2^{\mu}$ kHz, and $\mu$ is equal to one of 0, 1, 2, 3 and 4.

In a third aspect, an embodiment of the present application provides a base station which includes:

a mapping device configured to map a PRS sequence to a time-frequency resource for sending the PRS according to configuration information of the PRS; and a sending device configured to send the configuration information of the PRS to a terminal, and send a mapped PRS on the time-frequency resource for sending the PRS.

In one embodiment, the configuration information of the PRS includes a PRS RE density configuration parameter, and the PRS RE density configuration parameter is configured to indicate a quantity of REs for sending the PRS in PRS RBs.

In one embodiment, the configuration information of the PRS includes PRS frequency domain resource indication information, and the PRS frequency domain resource indication information includes a start of a downlink resource grid, a start of a PRS bandwidth, the PRS bandwidth, PRS amplitude scaling and PRS RE frequency shift indication information.

In one embodiment, the PRS RE frequency shift indication information includes a sequence number of symbols adopted by the PRS, a PRS sequence identity and a PRS RE density configuration parameter.

In one embodiment, the configuration information of the PRS includes PRS time domain resource indication information, and the PRS time domain resource indication information includes slot configuration information in PRS subframes and/or symbol configuration information in PRS slots; and the slot configuration information in the PRS subframes is configured to indicate slots for sending the PRS in the PRS subframes, and the symbol configuration information in the PRS slots is configured to indicate symbols for sending the PRS in the PRS slots.

In one embodiment, a bitmap serves as the slot configuration information in the PRS subframes, and the bitmap includes $2^{\mu}$ bits, and each bit corresponds to a slot in the PRS subframes. When the bits in the bitmap are set to a specified value, the slots corresponding to the bits set to the specified value are configured to send the PRS; and $\mu$ is equal to one of 0, 1, 2, 3 and 4.

In one embodiment, a bitmap serves as the symbol configuration information in the PRS slots, the bitmap includes $N_{symble}^{slot}$ bits, and each bit corresponds to a symbol in the PRS slots. When the bits in the bitmap are set to a specified value, the symbols corresponding to the bits set to the specified value are configured to send the PRS, and $N_{symble}^{slot}$ represents a quantity of symbols in a slot; or the symbol configuration information in the PRS slots is a PRS symbol configuration index in a symbol list, the symbol list includes N PRS symbol configuration indexes, each PRS symbol configuration index is configured to indicate symbols for sending the PRS in the PRS slots, and a length of the symbol list is $\log_2(N)$ bits, and N is an integer greater than or equal to 1.

In one embodiment, the PRS sequence is mapped to the frequency domain resource for sending the PRS according to a following formula:

$$a_{k,l}^{(p,\mu)} = \beta_{PRS} \gamma_{l,n_{s,f}}(n');$$

and:

$$k = (n + N_{PRS}^{start,\mu} + N_{grid,DL}^{start,\mu}) \times N_{SC}^{RB} + \frac{N_{SC}^{RB}}{c_{PRS}} k' + \upsilon_{shift};$$

$$\upsilon_{shift} = (l + N_{ID}^{PRS}) \bmod \left( \frac{N_{SC}^{RB}}{c_{PRS}} \right);$$

$$n' = c_{PRS} \times (n + N_{PRS}^{start,\mu}) + k';$$

$$n = 0, 1, \ldots, N_{RB}^{PRS} - 1;$$

$$k' = 0, 1, \ldots, c_{PRS} - 1;$$

In one embodiment, a reference of k is a subcarrier 0 in a common resource block 0 in a common resource block grid, $N_{grid,DL}^{start,\mu}$ represents a start of a downlink resource grid, $N_{PRS}^{start,\mu}$ represents a start of a PRS bandwidth, $N_{RB}^{PRS}$ represents the PRS bandwidth, $\beta_{PRS}$ represents PRS amplitude scaling, $\upsilon_{shift}$ represents PRS RE frequency shift, l represents a sequence number of orthogonal frequency division multiplexing (OFDM) symbols adopted by the PRS, $N_{ID}^{PRS}$ represents a PRS sequence identity, $N_{SC}^{RB}$ represents a quantity of subcarriers in each PRS RB, $c_{PRS}$ represents a PRS RE density configuration parameter, and $\gamma_{l,n_{s,f}}(n')$ represents the PRS sequence with an OFDM symbol sequence number of l in a slot $n_{s,f}$.

In one embodiment, the PRS sequence is generated according to a pseudo-random sequence, a size of the downlink resource grid, and the PRS RE density configuration parameter; and an initial value of the pseudo-random sequence is generated according to a sequence number of slots adopted by the PRS, a sequence number of symbols in corresponding slots, and a PRS sequence identity.

In one embodiment, the initial value of the pseudo-random sequence is:

$$c_{init} = \left\{ 2^{28+\mu} \times \left\lfloor \frac{N_{ID}^{PRS}}{1024} \right\rfloor + 2^{10} \times (14 \times (n_{s,f}^{\mu} + 1) + l + 1) \times (N_{ID}^{PRS} \mod 1024 + 1) + (N_{ID}^{PRS} \mod 1024) \right\} \mod 2^{31};$$

In one embodiment, $c_{init}$ represents the initial value of the pseudo-random sequence; $n_{s,f}^{\mu}$ represents a slot sequence number within a radio frame for subcarrier spacing configuration $\mu$, $\mu$ represents a subcarrier spacing configuration parameter, and $\mu \in \{0,1,2,3,4\}$; l represents a sequence number of OFDM symbols within a slot $n_{s,f}^{\mu}$; and $N_{ID}^{PRS}$ represents the PRS sequence identity.

In one embodiment, the initial value of the pseudo-random sequence is:

$$c_{init} = (2^{16} \times (14 \times n_{s,f}^{\mu} + l + 1) \times (2N_{ID}^{PRS} + 1) + N_{ID}^{PRS}) \mod 2^{31};$$

In one embodiment, $c_{init}$ represents the initial value of the pseudo-random sequence; $n_{s,f}^{\mu}$ represents a slot sequence number within a radio frame for subcarrier spacing configuration $\mu$, $\mu$ represents a subcarrier spacing configuration parameter, and $\mu \in \{0,1,2,3,4\}$; l represents a sequence number of OFDM symbols within a slot $n_{s,f}^{\mu}$; and $N_{ID}^{PRS}$ represents the PRS sequence identity.

In one embodiment, the subcarrier spacing of PRSs is $\Delta f_{PRS} = 15 \times 2^{\mu}$ kHz, and $\mu$ is equal to one of 0, 1, 2, 3 and 4.

In a fourth aspect, an embodiment of the present application provides a terminal which includes:

an obtaining device configured to obtain configuration information of a PRS; and a receiving device configured to receive the PRS on a time-frequency resource for sending the PRS according to the configuration information of the PRS, and the PRS is sent by a base station.

In one embodiment, the configuration information of the PRS includes a PRS RE density configuration parameter, and the PRS RE density configuration parameter is configured to indicate a quantity of REs for sending the PRS in PRS RBs.

In one embodiment, the configuration information of the PRS includes PRS frequency domain resource indication information, and the PRS frequency domain resource indication information includes a start of a downlink resource grid, a start of a PRS bandwidth, the PRS bandwidth, PRS amplitude scaling and PRS RE frequency shift indication information.

In one embodiment, the PRS RE frequency shift indication information includes a sequence number of symbols adopted by the PRS, a PRS sequence identity and a PRS RE density configuration parameter.

In one embodiment, the configuration information of the PRS includes PRS time domain resource indication information, and the PRS time domain resource indication information includes slot configuration information in PRS subframes and/or symbol configuration information in PRS slots; and the slot configuration information in the PRS subframes is configured to indicate slots for sending the PRS in the PRS subframes, and the symbol configuration information in the PRS slots is configured to indicate symbols for sending the PRS in the PRS slots.

In one embodiment, a bitmap serves as the slot configuration information in the PRS subframes, and the bitmap includes $2^{\mu}$ bits, and each bit corresponds to a slot in the PRS subframes. When the bits in the bitmap are set to a specified value, the slots corresponding to the bits set to the specified value are configured to send the PRS; and is equal to one of 0, 1, 2, 3 and 4.

In one embodiment, a bitmap serves as the symbol configuration information in the PRS slots, the bitmap includes $N_{symble}^{slot}$ bits, and each bit corresponds to a symbol in the PRS slots. When the bits in the bitmap are set to a specified value, the symbols corresponding to the bits set to the specified value are configured to send the PRS, and $N_{symble}^{slot}$ represents a quantity of symbols in a slot; or the symbol configuration information in the PRS slots is a PRS symbol configuration index in a symbol list, the symbol list includes N PRS symbol configuration indexes, each PRS symbol configuration index is configured to indicate symbols for sending the PRS in the PRS slots, and a length of the symbol list is $\log_2(N)$ bits, and N is an integer greater than or equal to 1.

In one embodiment, the PRS sequence is mapped to the frequency domain resource for sending the PRS according to a following formula:

$$a_{k,l}^{(p,\mu)} = \beta_{PRS} \gamma_{l,n_{s,f}}(n');$$

and:

$$k = (n + N_{PRS}^{start,\mu} + N_{grid,DL}^{start,\mu}) \times N_{SC}^{RB} + \frac{N_{SC}^{RB}}{c_{PRS}} k' + \upsilon_{shift};$$

$$\upsilon_{shift} = (l + N_{ID}^{PRS}) \mod \left( \frac{N_{SC}^{RB}}{c_{PRS}} \right);$$

$$n' = c_{PRS} \times (n + N_{PRS}^{start,\mu}) + k';$$

$$n = 0, 1, \ldots, N_{RB}^{PRS} - 1;$$

$$k' = 0, 1, \ldots, c_{PRS} - 1;$$

In one embodiment, a reference of k is a subcarrier 0 in a common resource block 0 in a common resource block grid, $N_{grid,DL}^{start,\mu}$ represents a start of a downlink resource grid, $N_{PRS}^{start,\mu}$ represents a start of a PRS bandwidth, $N_{RB}^{PRS}$ represents the PRS bandwidth, $\beta_{PRS}$ represents PRS amplitude scaling, $\upsilon_{shift}$ represents PRS RE frequency shift, l represents a sequence number of orthogonal frequency division multiplexing (OFDM) symbols adopted by the PRS, $N_{ID}^{PRS}$ represents a PRS sequence identity, $N_{SC}^{RB}$ represents a quantity of subcarriers in each PRS RB, $c_{PRS}$ represents a PRS RE density configuration parameter, and $\gamma_{l,n_{s,f}}(n')$ represents the PRS sequence with an OFDM symbol sequence number of l in a slot $n_{s,f}$.

In one embodiment, the PRS sequence is generated according to a pseudo-random sequence, a size of the downlink resource grid, and the PRS RE density configuration parameter; and an initial value of the pseudo-random sequence is generated according to a sequence number of slots adopted by the PRS, a sequence number of symbols in corresponding slots, and a PRS sequence identity.

In one embodiment, the initial value of the pseudo-random sequence is:

$$c_{init} = \left\{ 2^{28+\mu} \times \left\lfloor \frac{N_{ID}^{PRS}}{1024} \right\rfloor + 2^{10} \times (14 \times (n_{s,f}^{\mu} + 1) + l + 1) \times (N_{ID}^{PRS} \bmod 1024 + 1) + (N_{ID}^{PRS} \bmod 1024) \right\} \bmod 2^{31};$$

In one embodiment, $c_{init}$ represents the initial value of the pseudo-random sequence; $n_{s,f}^{\mu}$ represents a slot sequence number within a radio frame for subcarrier spacing configuration $\mu$, $\mu$ represents a subcarrier spacing configuration parameter, and $\mu \in \{0,1,2,3,4\}$; l represents a sequence number of OFDM symbols within a slot $n_{s,f}^{\mu}$; and $N_{ID}^{PRS}$ represents the PRS sequence identity.

In one embodiment, the initial value of the pseudo-random sequence is:

$$c_{init} = (2^{16} \times (14 \times n_{s,f}^{\mu} + l + 1) \times (2N_{ID}^{PRS} + 1) + N_{ID}^{PRS}) \bmod 2^{31};$$

In one embodiment, represents the initial value of the pseudo-random sequence; $n_{s,f}^{\mu}$ represents a slot sequence number within a radio frame for subcarrier spacing configuration $\mu$, $\mu$ represents a subcarrier spacing configuration parameter, and $\mu \in \{0,1,2,3,4\}$; l represents a sequence number of OFDM symbols within a slot $n_{s,f}^{\mu}$; and $N_{ID}^{PRS}$ represents the PRS sequence identity.

In one embodiment, the subcarrier spacing of PRSs is $\Delta f_{PRS} = 15 \times 2^{\mu}$ kHz, and $\mu$ is equal to one of 0, 1, 2, 3 and 4.

In a fifth aspect, an embodiment of the present application provides a base station which includes: a processor and a memory; and the processor is configured to read a program in the memory to:

map a PRS sequence to a time-frequency resource for sending the PRS according to configuration information of the PRS; send the configuration information of the PRS to a terminal; and send a mapped PRS on the time-frequency resource for sending the PRS.

In one embodiment, the configuration information of the PRS includes a PRS RE density configuration parameter, and the PRS RE density configuration parameter is configured to indicate a quantity of REs for sending the PRS in PRS RBs.

In one embodiment, the configuration information of the PRS includes PRS frequency domain resource indication information, and the PRS frequency domain resource indication information includes a start of a downlink resource grid, a start of a PRS bandwidth, the PRS bandwidth, PRS amplitude scaling and PRS RE frequency shift indication information.

In one embodiment, the PRS RE frequency shift indication information includes a sequence number of symbols adopted by the PRS, a PRS sequence identity and a PRS RE density configuration parameter.

In one embodiment, the configuration information of the PRS includes PRS time domain resource indication information, and the PRS time domain resource indication information includes slot configuration information in PRS subframes and/or symbol configuration information in PRS slots; and the slot configuration information in the PRS subframes is configured to indicate slots for sending the PRS in the PRS subframes, and the symbol configuration information in the PRS slots is configured to indicate symbols for sending the PRS in the PRS slots.

In one embodiment, a bitmap serves as the slot configuration information in the PRS subframes, and the bitmap includes $2^{\mu}$ bits, and each bit corresponds to a slot in the PRS subframes. When the bits in the bitmap are set to a specified value, the slots corresponding to the bits set to the specified value are configured to send the PRS and $\mu$ is equal to one of 0, 1, 2, 3 and 4.

In one embodiment, a bitmap serves as the symbol configuration information in the PRS slots, the bitmap includes $N_{symble}^{slot}$ bits, and each bit corresponds to a symbol in the PRS slots. When the bits in the bitmap are set to a specified value, the symbols corresponding to the bits set to the specified value are configured to send the PRS, wherein $N_{symble}^{slot}$ represents a quantity of symbols in a slot; or the symbol configuration information in the PRS slots is a PRS symbol configuration index in a symbol list, the symbol list includes N PRS symbol configuration indexes, each PRS symbol configuration index is configured to indicate symbols for sending the PRS in the PRS slots, and a length of the symbol list is $\log_2(N)$ bits, wherein N is an integer greater than or equal to 1.

In one embodiment, the PRS sequence is mapped to the frequency domain resource for sending the PRS according to a following formula:

$$a_{k,l}^{(p,\mu)} = \beta_{PRS} \gamma_{l,n_{s,f}}(n');$$

wherein:

$$k = (n + N_{PRS}^{start,\mu} + N_{grid,DL}^{start,\mu}) \times N_{SC}^{RB} + \frac{N_{SC}^{RB}}{c_{PRS}} k' + v_{shift};$$

$$v_{shift} = (l + N_{ID}^{PRS}) \bmod \left( \frac{N_{SC}^{RB}}{c_{PRS}} \right);$$

$$n' = c_{PRS} \times (n + N_{PRS}^{start,\mu}) + k';$$

$$n = 0, 1, \ldots, N_{RB}^{PRS} - 1;$$

$$k' = 0, 1, \ldots, c_{PRS} - 1;$$

wherein, a reference of k is a subcarrier 0 in a common resource block 0 in a common resource block grid, $N_{grid,DL}^{start,\mu}$ represents a start of a downlink resource grid, $N_{PRS}^{start,\mu}$ represents a start of a PRS bandwidth, $N_{RB}^{PRS}$ represents the PRS bandwidth, $\beta_{PRS}$ represents PRS amplitude scaling, $v_{shift}$ represents PRS RE frequency shift, l represents a sequence number of orthogonal frequency division multiplexing (OFDM) symbols adopted by the PRS, $N_{ID}^{PRS}$ represents a PRS sequence identity, $N_{SC}^{RB}$ represents a quantity of subcarriers in each PRS RB, $c_{PRS}$ represents a PRS RE density configuration parameter, and $\gamma_{l,n_{s,f}}(n')$ represents the PRS sequence with an OFDM symbol sequence number of l in a slot $n_{s,f}$.

In one embodiment, the PRS sequence is generated according to a pseudo-random sequence, a size of the downlink resource grid, and the PRS RE density configuration parameter; and an initial value of the pseudo-random sequence is generated according to a sequence number of slots adopted by the PRS, a sequence number of symbols in corresponding slots, and a PRS sequence identity.

In one embodiment, the initial value of the pseudo-random sequence is:

$$c_{init} = \left\{ 2^{28+\mu} \times \left\lfloor \frac{N_{ID}^{PRS}}{1024} \right\rfloor + 2^{10} \times (14 \times (n_{s,f}^{\mu}+1)+l+1) \times (N_{ID}^{PRS} \bmod 1024 + 1) + (N_{ID}^{PRS} \bmod 1024) \right\} \bmod 2^{31};$$

wherein, $c_{init}$ represents the initial value of the pseudo-random sequence; $n_{s,f}^{\mu}$ represents a slot sequence number within a radio frame for subcarrier spacing configuration $\mu$, $\mu$ represents a subcarrier spacing configuration parameter, and $\mu \in \{0,1,2,3,4\}$; l represents a sequence number of OFDM symbols within a slot $n_{s,f}^{\mu}$; and $N_{ID}^{PRS}$ represents the PRS sequence identity.

In one embodiment, the initial value of the pseudo-random sequence is:

$$c_{init} = (2^{16} \times (14 \times n_{s,f}^{\mu}+l+1) \times (2N_{ID}^{PRS}+1) + N_{ID}^{PRS}) \bmod 2^{31};$$

wherein, $c_{init}$ represents an initial value of the pseudo-random sequence; $n_{s,f}^{\mu}$ represents a slot sequence number within a radio frame for subcarrier spacing configuration $\mu$, $\mu$ represents a subcarrier spacing configuration parameter, and $\mu \in \{0,1,2,3,4\}$; l represents a sequence number of OFDM symbols within a slot $n_{s,f}^{\mu}$; and $N_{ID}^{PRS}$ represents the PRS sequence identity.

In one embodiment, the subcarrier spacing of PRSs is $\Delta f_{PRS}=15 \times 2^{\mu}$ kHz, wherein $\mu$ is equal to one of 0, 1, 2, 3 and 4.

In a sixth aspect, an embodiment of the present application provides a terminal which includes: a processor and a memory;

the processor is configured to read a program in the memory to:

obtain configuration information of a PRS; and receive the PRS on a time-frequency resource for sending the PRS through a terminal according to the configuration information of the PRS, wherein the PRS is sent by a base station.

In one embodiment, the configuration information of the PRS includes a PRS RE density configuration parameter, and the PRS RE density configuration parameter is configured to indicate a quantity of REs for sending the PRS in PRS RBs.

In one embodiment, the configuration information of the PRS includes PRS frequency domain resource indication information, and the PRS frequency domain resource indication information includes a start of a downlink resource grid, a start of a PRS bandwidth, the PRS bandwidth, PRS amplitude scaling and PRS RE frequency shift indication information.

In one embodiment, the PRS RE frequency shift indication information includes a sequence number of symbols adopted by the PRS, a PRS sequence identity and a PRS RE density configuration parameter.

In one embodiment, the configuration information of the PRS includes PRS time domain resource indication information, and the PRS time domain resource indication information includes slot configuration information in PRS subframes and/or symbol configuration information in PRS slots and the slot configuration information in the PRS subframes is configured to indicate slots for sending the PRS in the PRS subframes, and the symbol configuration information in the PRS slots is configured to indicate symbols for sending the PRS in the PRS slots.

In one embodiment, a bitmap serves as the slot configuration information in the PRS subframes, and the bitmap includes $2^{\mu}$ bits, and each bit corresponds to a slot in the PRS subframes. When the bits in the bitmap are set to a specified value, the slots corresponding to the bits set to the specified value are configured to send the PRS and $\mu$ is equal to one of 0, 1, 2, 3 and 4.

In one embodiment, a bitmap serves as the symbol configuration information in the PRS slots, the bitmap includes $N_{symble}^{slot}$ bits, and each bit corresponds to a symbol in the PRS slots. When the bits in the bitmap are set to a specified value, the symbols corresponding to the bits set to the specified value are configured to send the PRS, wherein $N_{symble}^{slot}$ represents a quantity of symbols in a slot; or the symbol configuration information in the PRS slots is a PRS symbol configuration index in a symbol list, the symbol list includes N PRS symbol configuration indexes, each PRS symbol configuration index is configured to indicate symbols for sending the PRS in the PRS slots, and a length of the symbol list is $\log_2(N)$ bits, wherein N is an integer greater than or equal to 1.

In one embodiment, the PRS sequence is mapped to the frequency domain resource for sending the PRS according to a following formula:

$$a_{k,l}^{(p,\mu)} = \beta_{PRS} \gamma_{l,n_{s,f}}(n');$$

wherein:

$$k = (n + N_{PRS}^{start,\mu} + N_{grid,DL}^{start,\mu}) \times N_{SC}^{RB} + \frac{N_{SC}^{RB}}{c_{PRS}} k' + v_{shift};$$

$$v_{shift} = (l + N_{ID}^{PRS}) \bmod \left( \frac{N_{SC}^{RB}}{c_{PRS}} \right);$$

$$n' = c_{PRS} \times (n + N_{PRS}^{start,\mu}) + k';$$

$$n = 0, 1, \ldots, N_{RB}^{PRS} - 1;$$

$$k' = 0, 1, \ldots, c_{PRS} - 1;$$

wherein, a reference of k is a subcarrier 0 in a common resource block 0 in a common resource block grid, $N_{grid,DL}^{start,\mu}$ represents a start of a downlink resource grid, $N_{PRS}^{start,\mu}$ represents a start of a PRS bandwidth, $N_{RB}^{PRS}$ represents the PRS bandwidth, $\beta_{PRS}$ represents PRS amplitude scaling, $v_{shift}$ represents PRS RE frequency shift, l represents a sequence number of orthogonal frequency division multiplexing (OFDM) symbols adopted by the PRS, $N_{ID}^{PRS}$ represents a PRS sequence identity, $N_{SC}^{RB}$ represents a quantity of subcarriers in each PRS RB, $c_{PRS}$ represents a PRS RE density configuration parameter, and $\gamma_{l,n_{s,f}}(n')$ represents the PRS sequence with an OFDM symbol sequence number of l in a slot $n_{s,f}$.

In one embodiment, the PRS sequence is generated according to a pseudo-random sequence, a size of the downlink resource grid, and the PRS RE density configuration parameter; and an initial value of the pseudo-random sequence is generated according to a sequence number of slots adopted by the PRS, a sequence number of symbols in corresponding slots, and a PRS sequence identity.

In one embodiment, the initial value of the pseudo-random sequence is:

$$c_{init} = \left\{ 2^{28+\mu} \times \left\lfloor \frac{N_{ID}^{PRS}}{1024} \right\rfloor + 2^{10} \times (14 \times (n_{s,f}^{\mu}+1)+l+1) \times (N_{ID}^{PRS} \bmod 1024 + 1) + (N_{ID}^{PRS} \bmod 1024) \right\} \bmod 2^{31};$$

wherein, $c_{init}$ represents the initial value of the pseudo-random sequence; $n_{s,f}^{\mu}$ represents a slot sequence number within a radio frame for subcarrier spacing configuration μ, μ represents a subcarrier spacing configuration parameter, and μ∈{0,1,2,3, 4}; l represents a sequence number of OFDM symbols within a slot $n_{s,f}^{\mu}$; and $N_{ID}^{PRS}$ represents the PRS sequence identity.

In one embodiment, the initial value of the pseudo-random sequence is:

$$c_{init}=(2^{16} \times (14 \times n_{s,f}^{\mu}+l+1) \times (2N_{ID}^{PRS}+1)+N_{ID}^{PRS}) \bmod 2^{31};$$

wherein, represents the initial value of the pseudo-random sequence; $n_{s,f}^{\mu}$ represents a slot sequence number within a radio frame for subcarrier spacing configuration μ, μ represents a subcarrier spacing configuration parameter, and μ∈{0,1,2,3,4}; l represents a sequence number of OFDM symbols within a slot $n_{s,f}^{\mu}$; and $N_{ID}^{PRS}$ represents the PRS sequence identity.

In one embodiment, the subcarrier spacing of PRSs is $\Delta f_{PRS}=15 \times 2^{\mu}$ kHz, wherein μ is equal to one of 0, 1, 2, 3 and 4.

In a seventh aspect, an embodiment of the present application provides a computer-readable storage medium, the computer-readable storage medium stores computer-executable instructions, and the computer-executable instructions are configured to enable a computer to execute any of the above-mentioned method described in the first aspect.

In an eighth aspect, an embodiment of the present application provides a computer-readable storage medium, the computer-readable storage medium stores computer-executable instructions, and the computer-executable instructions are configured to enable a computer to execute any of the above-mentioned method described in the second aspect.

Figure 1:
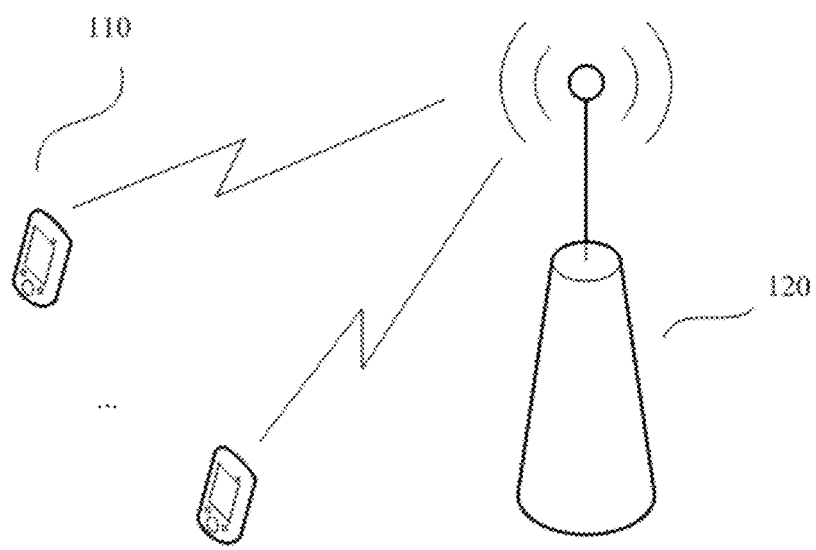
FIG. 1 is a schematic diagram of a communication system architecture applicable to an embodiment of the present application.

DETAILED DESCRIPTION OF THE EMBODIMENTS (1) In the embodiments of the present application, the terms "network" and "system" are often used interchangeably.

(2) The term "multiple" in the embodiments of the present application refers to two or more, and other quantifiers are similar in usage.

(3) The word "and/or" describes the association relationship of associated objects, and indicates that three types of relationships may exist, for example, A and/or B may mean: A exists alone, A and B coexist simultaneously, and B exists alone. The character "I" generally indicates that the associated objects before and after the character are in an "alternative" relationship.

(4) In the embodiments of the present application, for the convenience of description, the following terms are defined.

PRS subframe: a subframe configured to send a PRS in a radio frame, that is, the PRS is sent in the subframe.

PRS slot: a slot configured to send a PRS in a PRS subframe, that is, the PRS is sent in the slot.

PRS RB: a RB configured to send a PRS, that is, the PRS is sent in the RB.

PRS RE: a RE configured to send a PRS, that is, the PRS is sent in the RE.

(5) In the embodiments of the present application, for the convenience of description, the following parameters are defined.

(k,l)p,μ: resource element with frequency domain index k and time domain index l for antenna port P and subcarrier spacing configuration μ.

$a_{k,l}^{(p,\mu)}$: value of resource element (k,l) for antenna port P and subcarrier spacing configuration μ, namely data mapped to the resource element (k,l) for antenna port P and subcarrier spacing configuration μ.

$\beta_{PRS}$: amplitude scaling for positioning reference signal.

c(m): pseudo-random sequence.

Δf: subcarrier spacing.

$\Delta f_{PRS}$: subcarrier spacing for positioning reference signals.

k: subcarrier index relative to a reference.

l: orthogonal frequency division multiplexing (OFDM) symbol index within a slot.

μ: subcarrier spacing configuration, and $\Delta f = 15 \times 2^{\mu}$.

$N_{grid,DL}^{size,\mu}$: the size of a downlink resource grid for subcarrier spacing configuration μ.

$N_{grid,DL}^{start,\mu}$: the start of a downlink resource grid for subcarrier spacing configuration μ.

$N_{ID}^{cell}$: physical layer cell identity.

$N_{ID}^{PRS}$: positioning reference signal (PRS) sequence identity.

$N_{sc}^{RB}$: number of subcarriers per resource block.

$N_{slot}^{subframe,\mu}$: number of slots per subframe for subcarrier spacing configuration P. $N_{slot}^{frame,\mu}$: number of slots per frame for subcarrier spacing configuration P.

$N_{symb}^{subframe,\mu}$: number of OFDM symbols per subframe for subcarrier spacing configuration P.

$N_{symb}^{slot}$: number of OFDM symbols per slot.

$n_s^{\mu}$: slot number within a subframe for subcarrier spacing configuration P.

$n_{s,f}^{\mu}$: slot number within a frame for subcarrier spacing configuration P.

P: antenna port number for PRS.

The technical solutions in the embodiments of the present application are clearly and completely described below in conjunction with the accompanying drawings in the embodiments of the present application.

FIG. 1 is a schematic diagram of a possible communication scene provided by an embodiment of the present application. As shown in FIG. 1, a terminal 110 accesses a wireless network through a radio access network (RAN) node 120 to obtain services from an external network (such as the Internet) through the wireless network, or communicate with other terminals through the wireless network.

Wherein, the terminal is also called user equipment (UE), a mobile station (MS), a mobile terminal (MT) and so on, and is equipment providing users with voice and/or data connectivity, such as handheld equipment and vehicle-mounted equipment with wireless connection function. At present, some examples of the terminal are: a mobile phone, a tablet, a laptop, a handheld computer, a mobile internet device (MID), wearable equipment, virtual reality (VR) equipment, augmented reality (AR) equipment, a wireless terminal in industrial control, a wireless terminal in self-driving, a wireless terminal in remote medical surgery, a wireless terminal in smart grids, a wireless terminal in transportation safety, wireless terminal in smart cities, and a wireless terminal in smart homes.

A RAN is a part of the network that connects the terminal to the wireless network. A RAN node (or equipment) is a node (or equipment) in the radio access network, and can also be called a base station. At present, some examples of the RAN node are: a gNB, a transmission reception point (TRP), an evolved Node B (eNB), a radio network controller (RNC), a Node B (NB), a base station controller (BSC), a base transceiver station (BTS), a home base station (such as a home evolved Node B, or a home Node B (HNB)), a base band unit (BBU), or a wireless fidelity (Wifi) access point (AP), etc. In addition, in a network structure, the RAN may include a centralized unit (CU) node and a distributed unit (DU) node.

The above-mentioned communication architecture may be an evolved version of a 5G system or a long term evolution (LTE) system, or an access network architecture in other OFDM systems or discrete Fourier transform-spread OFDM (DFT-S-OFDM) systems.

The network architecture described in the embodiments of the present application can illustrate the technical solutions of the embodiments of the present application more clearly, and does not constitute a limitation on the technical solutions provided by the embodiments of the present application.

The embodiments of the present application are described by taking a base station and a terminal as examples.

Based on the above communication system architecture, OTDOA terminal positioning can be realized. In one embodiment, the base station may map a PRS sequence to a time-frequency resource for sending the PRS according to the configuration information of the PRS, send the mapped PRS on the time-frequency resource for sending the PRS, and send the configuration information of the PRS to a terminal; and the terminal may receive the PRS sent by the base station on the time-frequency resource for sending the PRS according to the configuration information of the PRS. Further, the terminal may obtain RSTD according to measured PRSs from a serving cell and neighboring cells, and may report the RSTD to a network positioning server. Therefore, the network positioning server may determine the position of the terminal through a multi-point positioning algorithm or other algorithms according to the RSTD.

The PRS is defined in an LTE system to support OTDOA, and the PRS has not been defined in a 5G-NR system to support OTDOA. However, the PRS scheme in the LTE system cannot be directly applied to the 5G-NR system. Possible reasons may include one or more of the following aspects.

(1) The two systems are quite different in terms of PRS subcarrier spacing. An LTE PRS only supports subcarrier spacing $\Delta f=15$ kHz, while the 5G-NR system supports the downlink channel subcarrier spacing $\Delta f=15\times 2^\mu$ kHz, wherein $\mu=0,1,2,3,4,5$.

(2) The two systems are quite different in terms of PRS RE density. The LTE PRS adopts a fixed PRS RE distribution density, that is, each PRS RB is provided with 2 PRS REs regularly. The 5G-NR system supports a wider bandwidth and more complex scenes than those of the LTE system. For example, in a scene with dense neighboring cells, a terminal may receive downlink signals from many cells. In this scene, if a fixed PRS RE distribution density is still adopted, the possibility of PRS REs in adjacent cells overlapping each other is higher, and the mutual interference between PRSs from different cells increases, and then the PRS detectability may be reduced. Conversely, for a scene with sparse neighboring cells, if a fixed PRS RE distribution density is still adopted, the PRS resource utilization rate may be lowered, and the PRS detectability may also be reduced.

(3) In terms of PRS frequency domain resource mapping, the 5G-NR system needs to support flexible PRS frequency domain resource mapping modes. An LTE PRS frequency domain resource mapping method is as follows: if a PRS bandwidth is the same as a downlink carrier bandwidth, then a PRS is sent on the entire downlink carrier bandwidth; if the PRS bandwidth is narrower than the downlink carrier bandwidth, then the PRS is sent on a center band of the downlink carrier bandwidth. The downlink carrier bandwidth supported by the 5G-NR system is much wider than the downlink carrier bandwidth supported by the LTE system, and 5G-NR supports division of the downlink bandwidth into multiple (up to 4) bandwidth parts (BWP). Therefore, the PRSs in an NR system need to support flexible PRS frequency domain resource mapping modes.

(4) In terms of PRS time domain resource configuration, the 5G-NR system needs to support flexible PRS time domain resource configuration modes. An LTE PRS time domain resource configuration method adopts a configuration table to define the transmission period and time offset of PRS subframes of OTDOA positioning occasions. Each PRS configuration index in the configuration table defines a relative combination $\Delta_{PPS}$ of the transmission period $T_{PRS}$ and slot offset of PRS subframes. Each OTDOA positioning occasion may be configured with N_PRS (N_PRS≥1) PRS subframes. In each subframe, OFDM symbols for sending PRSs are fixed and cannot be adjusted. The PRSs need to support more flexible PRS time domain resource configuration modes.

In addition, a PRS pseudo-random sequence generator initialization method in the 5G-NR system may also be a method different from that of the LTE system.

Based on the foregoing reasons, the embodiments of the present application define a PRS and provide a transmission related scheme for the PRS. The embodiments of the present application may be applicable to wireless communication systems such as a 5G-NR system acquisition evolution system.

Taking application of the embodiments of the present application to the 5G-NR system as an example, the PRS (hereinafter referred to as NR PRS) and the transmission related scheme thereof defined in the embodiments of the present application have one or more of the following characteristics.

(1) PRS Subcarrier Spacing.

The 5G-NR system supports the downlink channel subcarrier spacing $\Delta f=15\times2^{\mu}$ kHz, wherein $\mu=0,1,2,3,4,5$. Wherein, subcarrier spacing $\Delta f=15\times2^5=240$ kHz is only configured for sending SSB (synchronization signal and PBCH (physical broadcast channel) block). Therefore, in the embodiments of the present application, the PRS subcarrier spacing is expanded to $\Delta f_{PRS}=15\times2^{\mu}$ kHz, wherein P is subcarrier spacing configuration and is an integer, $\mu \in \{0,1,2,3,4\}$, that is, $\mu$ is equal to one of 0, 1, 2, 3 and 4.

(2) Number of PRS Antenna Ports.

For the 5G-NR system, a downlink synchronization signal and a PBCH may be sent on a single antenna port. Therefore, the embodiments of the present application at least support sending the PRS on a single antenna port.

(3) PRS RE Density Configuration Parameter.

The PRS RE density con figuration parameter is configured to indicate the number of REs for sending the PRS in PRS RBs. The PRS RE density configuration parameter may be used as configuration information of the PRS and sent by the base station to the terminal. More In one embodiment, the base station may determine the PRS RE density configuration parameter according to the density of neighboring cells, and send the parameter to the terminal as the configuration information of the PRS.

The 5G-NR system supports a wider bandwidth and more complex scenes than those of the LTE system. The network can configure the RE density configuration parameter $c_{PRS}$ according to the density of neighboring cells. In one embodiment, the PRS RE density configuration parameter $c_{PRS}$ configured for a scene with dense neighboring cells is smaller than the PRS RE density configuration parameter $c_{PRS}$ configured for a scene with sparse neighboring cells, so that the $c_{PRS}$ is configured to rationally use PRS resources and reduce mutual interference between PRSs of different cells. Wherein, the density of neighboring cells may be judged through a predefined threshold. For example, a cell density threshold (such as the number of neighboring cells included in a unit area) may be predefined. If the density of neighboring cells exceeds the threshold, then the neighboring cells are considered dense, otherwise the neighboring cells are considered sparse.

For example, in a scene with dense neighboring cells, a terminal may receive downlink signals from many cells. In this scene, through appropriate reduction of the distribution density of PRS REs (namely configuring a small $c_{PRS}$), the possibility of overlapping PRS REs of adjacent cells and mutual interference between PRSs from different cells can be lowered, so that the detectability of PRSs is enhanced. Conversely, for a scene with sparse neighboring cells, PRS RE overlapping interference from neighboring cells is not a major problem, In this scene, a large $c_{PRS}$ can be configured to increase the distribution density of PRS REs, which can increase the utilization rate of PRS resources without reducing or even enhancing the detectability of PRS.

In one embodiment, the length of a PRS sequence is related to the PRS RE density configuration parameter.

(4) PRS Sequence.

In the embodiments of the present application, the length of the PRS sequence is related to the PRS RE density configuration parameter and the size of a downlink resource grid. In one embodiment, the PRS sequence may be generated according to a pseudo-random sequence, and the pseudo-random sequence is related to the PRS RE density configuration parameter and the size of the downlink resource grid, so that the length of the PRS sequence is related to the PRS RE density configuration parameter and the size of the downlink resource grid.

In a possible implementation in the embodiments of the present application, when the subcarrier spacing is configured as $\mu$ ($\mu \in \{0,1,2,3,4\}$), the method for generating the PRS sequence $\gamma_{l,n_{s,f}}(m)$ of an OFDM symbol with a sequence number l in a slot $n_{s,f}^{\mu}$ is as follows:

$$\gamma_{l,n_{s,f}}(m) = \frac{1}{\sqrt{2}}(1-2\times c(2m)) + j\frac{1}{\sqrt{2}}(1-2\times c(2m+1)) \quad [1]$$

$$m = 0, 1, \ldots, c_{PRS} \times N_{grid,DL}^{size,\mu} - 1$$

Wherein, c(m) is a pseudo-random sequence, which may be a 31-bit Gold sequence defined in section 5.2.1 of the LTE communication protocol TS38.211. $N_{grid,DL}^{size,\mu}$ is a size of the downlink resource grid for subcarrier spacing configuration $\mu$ ($\mu \in \{0,1,2,3,4\}$). $c_{PRS}$ is the PRS RE density configuration parameter and is configured to indicate the number of REs for sending a PRS in a PRS RB, $c_{PRS} \in \{1/2, 1, 2, 3\}$, and $c_{PRS}$ is configurable. The length of the generated PRS sequence $\gamma_{l,n_{s,f}}(m)$ is $c_{PRS} \times N_{grid,DL}^{size,\mu}$ to support the transmission of PRS in the whole or a part of the downlink bandwidth.

In one embodiment, in the embodiments of the present application, in order to maximize the randomization of the PRS sequence from the cells to reduce the cross correlation between the PRSs of the adjacent cells, the pseudo-random sequence c(m) may be initialized, that is, the pseudo-random sequence generator is initialized. The initial value $c_{init}$ of the pseudo-random sequence c(m) depends on the subcarrier spacing configuration $\mu$ adopted by the PRSs, the slot number $n_{s,f}^{\mu}$ in the radio frame, the sequence number l of OFDM symbols in the slot $n_{s,f}^{\mu}$ and the PRS sequence identity $N_{ID}^{PRS}$.

Based on this, in order to randomize the PRS sequence from the cells as much as possible, the embodiments of the present application provide the following two pseudo-random sequence generator initialization methods.

(1) Pseudo-Random Sequence Generator Initialization Method 1.

Method 1 is similar to an initialization method of an LTE PRS pseudo-random sequence generator. The differences are that the downlink channel subcarrier spacing $\Delta f_{PRS}$ supported by PRSs is equal to $15\times2^{\mu}$ kHz ($\mu=0,1,2,3,4$) and NR supports 1024 different physical layer cell identities $N_{ID}^{cell}$, while the LTE system only supports 512 different physical layer cell identities $N_{ID}^{cell}$.

In method 1, the pseudo-random sequence generator may be initialized according to the slot (sequence number) adopted by the PRSs, subcarrier spacing configuration, OFDM symbols (sequence number) and PRS sequence identity, so that neighboring cells may send different PRSs as much as possible. Therefore, the mutual interference between PRSs of different cells is reduced, and the detectability of PRSs is enhanced.

In one embodiment, the pseudo-random sequence generator initialization method 1 may be expressed as:

$$c_{init} = \left\{ 2^{28+\mu} \times \left\lfloor \frac{N_{ID}^{PRS}}{1024} \right\rfloor + 2^{10} \times (14 \times (n_{s,f}^{\mu} + 1) + l + 1) \times \right. \quad [2]$$

$$\left. (N_{ID}^{PRS} \bmod 1024 + 1) + (N_{ID}^{PRS} \bmod 1024) \right\} \bmod 2^{31}$$

Wherein, $n_{s,f}^{\mu}$ represents a slot sequence number within a radio frame for subcarrier spacing configuration $\mu$, $n_{s,f}^{\mu} \in \{0, \ldots, N_{slot}^{frame,\mu} - 1\}$ and $\mu \in \{0,1,2,3,4\}$. l represents the sequence number of OFDM symbols in the slot, and $l \in \{0,1, \ldots, N_{symb}^{slot} - 1\}$. $N_{ID}^{PRS}$ represents a PRS sequence identity, and $N_{ID}^{PRS}$ may be equal to a wireless cell identity $N_{ID}^{cell} \in \{0,1, \ldots, 1023\}$ or may be configured as $N_{ID}^{PRS} \in \{0,1, \ldots, 4095\}$ by the network. The operational symbol "mod" represents modulo operation. The operational symbol "$\lfloor \cdot \rfloor$" represents rounding down.

(2) Pseudo-Random Sequence Generator Initialization Method 2.

Method 2 is similar to an NR physical downlink control channel (PDCCH)/physical downlink shared channel (physical downlink shared channel, PDSCH) demodulation reference signal (DM-RS) pseudo-random sequence generator initialization method. The initialization expression of the NR PDCCH/PDSCH MR-RS pseudo-random sequence generator is:

$$c_{init} = (2^{17} \times (14 \times n_{s,f}^{\mu} + l + 1) \times (2N_{ID} + 1) + 2N_{ID}) \bmod 2^{31} \quad [3]$$

However, it can be seen from the above expression that the initial value $c_{init}$ of the pseudo-random sequence c(m) of the NR PDCCH/PDSCH DM-RS is always an even number, and the disadvantage is that the effective value range of the initial value $c_{init}$ of the pseudo-random sequence c(m) is actually reduced from 31 bits to 30 bits.

In order to make the change range of the effective value of the initial value $c_{init}$ of the pseudo-random sequence c(m) be 31 bits, the pseudo-random sequence generator initialization method 2 provided in the embodiments of the application may be expressed as:

$$c_{init} = (2^{16} \times (14 \times n_{s,f}^{\mu} + l + 1) \times (2N_{ID}^{PRS} + 1) + 2N_{ID}^{PRS}) \bmod 2^{31} \quad [4]$$

Wherein, $n_{s,f}^{\mu}$ represents a slot sequence number within a radio frame for subcarrier spacing configuration $\mu$, $n_{s,f}^{\mu} \in \{0, \ldots, N_{slot}^{frame,\mu} - 1\}$, and $\mu \in \{0,1,2,3,4\}$. l represents the sequence number of the OFDM symbols in the slot, and $l \in \{0,1, \ldots, N_{symb}^{slot} - 1\}$. $N_{ID}^{PRS}$ represents a PRS sequence identity. If $N_{ID}^{PRS}$ is not configured by the higher layer, $N_{ID}^{PRS}$ is equal to the wireless cell identity $N_{ID}^{cell}$, otherwise, $N_{ID}^{PRS}$ is the value configured by the higher layer, and $N_{ID}^{PRS}$ configured by the higher layer is $N_{ID}^{PRS} \in \{0,1, \ldots, 65535\}$. The operational symbol "mod" represents modulo operation.

The aforementioned pseudo-random sequence generator initialization method 1 and method 2 are only examples. In the embodiments of the present application, the same or substantially similar methods as the prior art may also be adopted for initialization.

(5) PRS Frequency Domain Resources.

In the embodiments of the present application, the configuration information of a PRS may include PRS frequency domain resource indication information which is configured to indicate frequency domain resources of the PRS. In one embodiment, the PRS frequency domain resource indication information may include a start of a downlink resource grid, a start of a PRS bandwidth, the PRS bandwidth, PRS amplitude scaling and PRS RE frequency shift indication information. Through the start of the downlink resource grid and the PRS bandwidth, the PRS transmission bandwidth can be configured, and the PRS can be configured at a desired frequency position. Through the PRS amplitude scaling $\beta_{PRS}$, the network can also configure the PRS sending power.

In the embodiments of the present application, PRSs of different bandwidths can be configured at corresponding frequency positions through the PRS frequency domain resource indication information as needed. Further, during PRS frequency domain resource mapping, the PRS RE frequency shift can be configured to reduce overlapping and interference between the PRSs of adjacent cells, wherein the value of the PRS RE frequency shift may be indicated by the PRS RE frequency shift indication information.

The PRS RE frequency shift is configured to indicate the positions of REs for sending PRSs in PRS RBs. In one embodiment, the PRS RE frequency shift may depend on the sequence number l of OFDM symbols adopted by the PRSs, a PRS sequence identity N and the PRS RE density configuration parameter $c_{PRS}$. Correspondingly, the PRS RE frequency shift indication information may be the value of the PRS RE frequency shift calculated according to the sequence number l of the OFDM symbols adopted by the PRSs, a PRS sequence identity $N_{ID}^{PRS}$ and the PRS RE density configuration parameter $c_{PRS}$. The PRS RE frequency shift indication information may also include multiple parameters configured to calculate the value of the PRS RE frequency shift, such as the sequence number l of the OFDM symbols adopted by the PRSs, a PRS sequence identity $N_{ID}^{PRS}$ and the PRS RE density configuration parameter $c_{PRS}$.

Based on the above considerations, a possible PRS RE frequency shift expression provided by the embodiments of the present application is as follows:

$$v_{shift} = (l + N_{ID}^{PRS}) \bmod \left( \frac{N_{SC}^{RB}}{c_{PRS}} \right) \quad [5]$$

Wherein, $v_{shift}$ represents PRS RE frequency shift; l represents a sequence number of the OFDM symbols occupied by the PRSs; $N_{ID}^{PRS}$ represents a PRS sequence identity; $N_{SC}^{RB}$ represents the number of subcarriers per resource block, and $c_{PRS}$ represents a PRS RE density configuration parameter and indicates the number of PRS REs per PRS RB. The operational symbol "mod" represents modulo operation.

Based on the above-mentioned frequency shift expression, the REs contained in a PRS RB can be divided into several parts according to the density configuration parameter $c_{PRS}$ each part includes several consecutive REs, and one RE in each part of REs is configured to send PRSs. In each part of the REs, the position offset of the RE for sending the PRSs in the part of the REs, such as the value of the PRS RE frequency shift $v_{shift}$ is the number of REs between the PRS RE and the REs located at the boundary of this part (including the REs at the boundary). Taking $c_{PRS}=2$ as an example, 12 REs contained in a PRS RB are divided into 2 parts, each part includes 6 consecutive REs, and there is one PRS RE (that is, one RE is configured to send PRS) among the 6 REs contained in each part. According to the above frequency shift expression, the number of REs between the PRS RE in the PRS RB and the REs at the boundary of the part can be calculated, that is, the position of the PRS RE in the PRS RB can be determined.

In some embodiments, PRS RE frequency shift expressions to determine the RE for sending the PRSs, which is not limited in the embodiments of the present application.

It can be seen from the above description that the PRS RE frequency shift can be determined according to the sequence number l of the OFDM symbols adopted by PRSs, a PRS sequence identity $N_{ID}^{PRS}$ and the PRS RE density configuration parameter $c_{PRS}$, that is, the position of the PRS frequency domain resource can be determined. Then PRSs can be mapped to different frequency domain resource positions according to different OFDM symbols adopted by PRSs and/or different PRS sequence identities to reduce overlapping and interference between the PRSs of adjacent cells. Further, the PRS RE frequency shift also depends on the PRS RE density configuration parameter. Since the PRS RE density configuration parameter may be configured according to the density of adjacent cells, the PRS RE density configuration parameter may be configured to further rationally use PRS resources and reduce mutual interference between PRSs in different cells.

In addition, according to the above embodiments, PRS resources of different bandwidths may be freely configured at the desired frequency positions. Therefore, the embodiments of the present application can support the scene where the downlink bandwidth is divided into multiple (up to 4) partial bandwidth (BWP) under the NR large bandwidth.

In the embodiments of the present application, the resource mapping formula for mapping the PRS sequence $\gamma_{l,n_{sf}}$ to a PRS RE may be expressed as:

$$\alpha_{k,l}^{(p,\mu)} = \beta_{PRS}\gamma_{l,n_{sf}}(n') \quad [6]$$

In one embodiment, $\alpha_{k,l}^{(p,\mu)}$ represents the value of the PRS RE (k,l) for antenna port p and subcarrier spacing configuration μ, that is, the data after the PRS sequence $\gamma_{l,n_{sf}}(n')$ is mapped to the RE may be expressed as $\alpha_{k,l}^{(p,\mu)}$. In one embodiment, μ∈{0,1,2,3,4}, $\beta_{PRS}$ represents PRS amplitude scaling and is configurable.

In the above formula (6), the expression of k is:

$$k = (n + N_{PRS}^{start,\mu} + N_{grid,DL}^{start,\mu}) \times N_{SC}^{RB} + \frac{N_{SC}^{RB}}{c_{PRS}}k' + v_{shift} \quad [7]$$

The reference A of the parameter k may be a subcarrier 0 in a common resource block 0 in a common resource block grid defined by the LTE system communication protocol Ts 38.211.

In the above formula, $N_{PRS}^{start,\mu}$ represents a start of a PRS bandwidth for subcarrier spacing configuration μ and is configurable, and μ∈{0,1, 2,3,4}. $N_{grid,DL}^{start,\mu}$ may be the start of the downlink resource grid defined by Ts 38.211. $N_{RB}^{PRS}$ represents the PRS bandwidth and is configurable. $c_{PRS}$ represents a PRS RE density configuration parameter.

In the above formula, n'=$c_{PRS}$×(n+$N_{PRS}^{start,\mu}$)+k', n and k' are integers, n∈{0,1, . . . , $N_{RB}^{PRS}$−1}, that is, n is equal to one of 0,1, . . . , $N_{RB}^{PRS}$−1, and k'∈{0,1, . . . ,$c_{PRS}$−1}, that is, k' is equal to one of 0,1, . . . , $c_{PRS}$−1.

Figure 2:
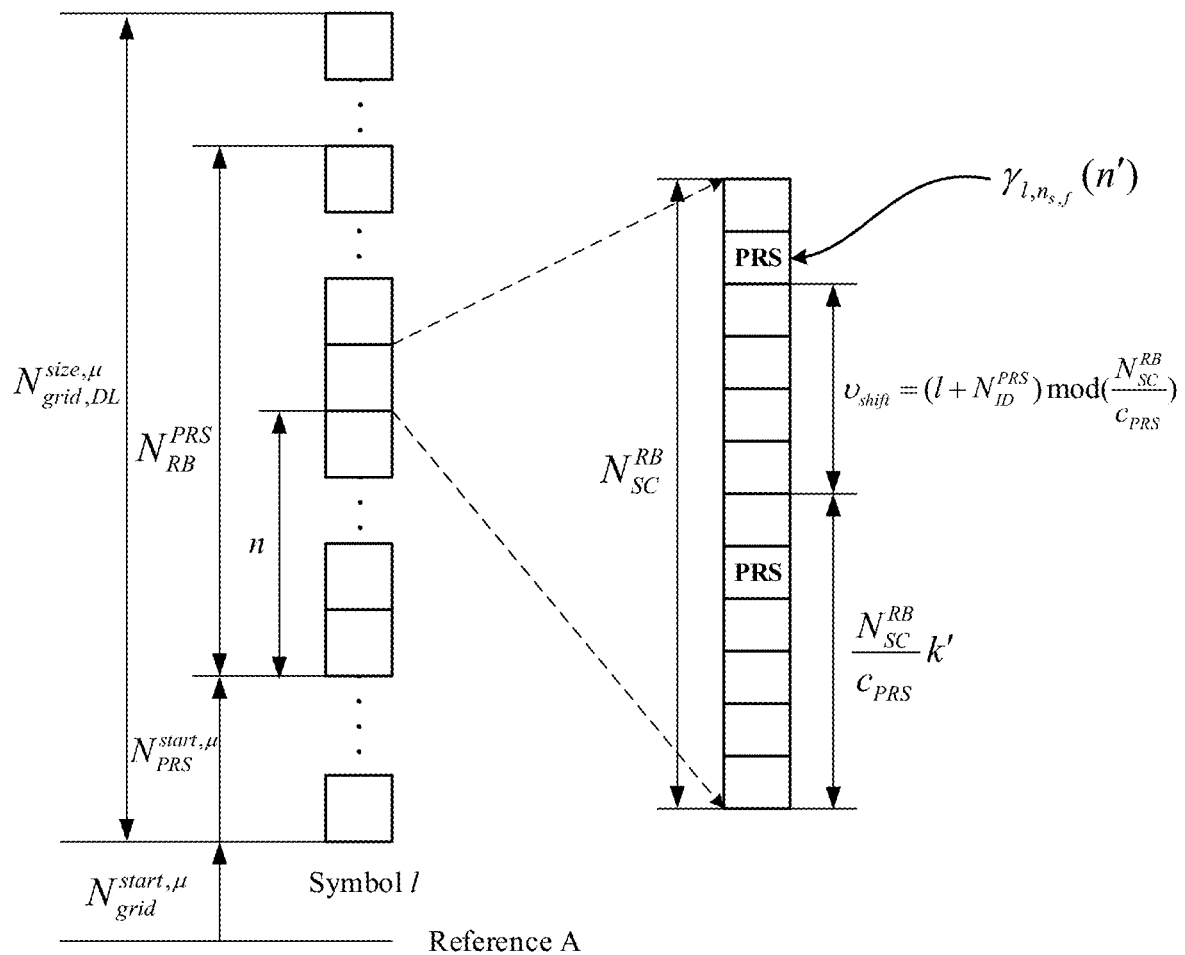
FIG. 2 is a schematic diagram of PRS resource mapping provided by an embodiment of the present application.

FIG. 2 exemplarily shows a schematic diagram of NR PRS resource frequency domain mapping by taking the PRS RE density configuration parameter $c_{PRS}$=2 as an example.

As shown in FIG. 2, a PRS RB may be determined according to the PRS configuration information, that is, the PRS RB may be determined by the PRS configuration information. PRS configuration information may include $N_{grid,DL}^{size,\mu}$, $N_{grid,DL}^{start,\mu}$, $N_{PRS}^{start,\mu}$, $N_{RB}^{PRS}$ and so on. Further, according to the PRS RE density configuration parameter $c_{PRS}$, the number of subcarriers in the PRS RB, and a PRS sequence identity $N_{ID}^{PRS}$, the positions of REs to which PRSs in the PRS RB are mapped can be determined. In this example, $c_{PRS}$=2, so that the PRS RB is divided into 2 parts, and each part contains 6 REs. If the frequency domain offset $v_{shift}$=4 is obtained through calculation according to the above formula (5), it can be determined that the second RE in each part is configured to send PRS. According to the above formula (6), $\alpha_{k,l}^{(p,\mu)}$ obtained after the PRS sequence with the identity $N_{ID}^{PRS}$ is mapped to the REs shown in the figure can be obtained.

(6) PRS Time Domain Resources.

In the embodiments of the present application, the PRS configuration information may include PRS time domain resource indication information for indicating PRS time domain resources. In one embodiment, the PRS time domain resource indication information may include slot configuration information in PRS subframes and/or symbol configuration information in PRS slots, the slot configuration information in the PRS subframes is configured to indicate slots for sending PRSs in the PRS subframes, and the symbol configuration information in the PRS slots is configured to indicate symbols for sending the PRSs in the PRS slots.

In one embodiment, the PRS time domain resource indication information may also include the transmission period and time offset of PRS subframes.

In other words, in the embodiments of the present application, in the time domain, the time domain resources of the PRSs can be configured in one or more of the following aspects: the transmission period and time offset of the PRS subframes, slots for sending the PRSs in the PRS subframes, and the symbols for sending the PRSs in the PRS slots.

The PRS time domain resource indication information in the above aspects is described below respectively.

(1) Transmission Period and Time Offset of PRS Subframes.

Each OTDOA positioning occasion includes $N_{PRS}$ consecutive PRS subframes. In the embodiments of the present application, the PRS transmission period and the PRS subframe offset of the OTDOA positioning occasion can be configured.

In the embodiments of the present application, multiple modes may be adopted to define the PRS transmission period and time offset. One possible implementation is to configure the PRS transmission period and the PRS subframe offset of the OTDOA positioning occasion following a design similar to that of the LTE system.

For example, a configuration table may be adopted to define the transmission period and slot offset of the PRS subframes of each OTDOA positioning occasion. Table 1 exemplarily shows a configuration table of the transmission period and time offset of NR PRS subframes. As shown in Table 1, each PRS configuration index $I_{PRS}$ defines the combination of the transmission period $T_{PRS}$ and slot offset $\Delta_{PRS}$ of the corresponding PRS subframe, that is, each PRS configuration index $I_{PRS}$ corresponds to (or indicates) the combination of the transmission period $T_{PRS}$ and slot offset $\Delta_{PRS}$ of the corresponding NR PRS subframe. The network can configure to send PRSs in $N_{PRS}$ ($N_{PRS}$≥1) consecutive downlink subframes for each OTDOA positioning occasion, and the time position of the first PRS subframe satisfies:

$$\left(10 \times n_f + \left\lfloor \frac{n_s}{2} \right\rfloor - \Delta_{PRS}\right) \bmod T_{PRS} = 0 \quad [8]$$

In one embodiment, $n_f$ represent a system frame number, $n_s$ represents a slot number in a system frame, $\Delta_{PRS}$ represents slot offset, and $T_{PRS}$ represents a PRS subframe transmission period.

TABLE 1

Configuration table of NR PRS subframe transmission period and slot offset

| PRS configuration index $I_{PRS}$ | PRS period $T_{PRS}$ (subframe) | PRS slot offset $\Delta_{PRS}$ (subframe) |
|---|---|---|
| 0-4 | 5 | $I_{PRS}$ |
| 5-14 | 10 | $I_{PRS}$ - 5 |
| 25-34 | 20 | $I_{PRS}$ - 25 |
| 35-74 | 40 | $I_{PRS}$ - 35 |
| 75-154 | 80 | $I_{PRS}$ - 75 |
| 155-314 | 160 | $I_{PRS}$ - 155 |
| 315-634 | 320 | $I_{PRS}$ - 315 |
| 635-1274 | 640 | $I_{PRS}$ - 635 |
| 1275-2554 | 1280 | $I_{PRS}$ - 1275 |
| 2555-4095 | Reserved | |

In Table 1, each PRS configuration index $I_{PRS}$ corresponds to a PRS subframe transmission period $T_{PRS}$ and a PRS slot offset $\Delta_{PRS}$. Taking the value of the PRS configuration index $I_{PRS}$ as 5 as an example, according to Table 1, the PRS subframe transmission period corresponding to the index value is $T_{PRS}=10$ (that is, PRSs are sent every 10 subframes), and the PRS slot offset corresponding to the index value is $\Delta_{PRS}=I_{PRS}-5$ (that is, in the PRS subframes, the PRSs are sent in the ($\Delta_{PRS}=I_{PRS}-5$)th slot).

(2) Slots for Sending PRSs in PRS Subframes.

In the embodiments of the present application, the slots for sending PRSs in PRS subframes may be configured. Since when the subcarrier spacing configuration $\mu>0$, there are multiple slots ($2^\mu$ slots) in a subframe, for example, when the subcarrier spacing configuration $\mu \in \{1,2,3\}$, there are $2^\mu$ slots in the subframe. Therefore, it is necessary to configure slots in the subframes which are configured to send PRSs and slots in the subframes which are reserved for data communication.

In the embodiments of the present application, a bitmap may be adopted to configure the slots for sending PRSs in PRS subframes. That is, a bitmap is used as slot configuration information in the PRS subframes to indicate which slots in the PRS subframes are configured to send PRSs. The bitmap may be a parameter with a length of at least $2^\mu$ bits. Each bit corresponds to a slot in a PRS subframe and different values of the bits indicate whether the corresponding slots are configured to send PRSs. For example, only when the value of the bit is "1", the slot corresponding to the bit is configured to send PRSs.

Table 2 exemplarily shows a table of slot configuration information in PRS subframes.

TABLE 2

Table of time slot configuration information in PRS subframes

| Subcarrier spacing configuration μ | Bitmap length (bits) | Notes |
|---|---|---|
| 1 | 2 | For downlink subframes, slots with the bits |
| 2 | 4 | set to "1" are configured to send PRSs |
| 3 | 8 | |

(3) Symbols for Sending PRSs in PRS Slots.

In an NR frequency division duplex (FDD) slot, all OFDM symbols are either all "downlink" symbols or all "uplink" symbols. In an NR time division duplex (TDD) slot, it is possible that all OFDM symbols are "downlink" symbols, or all are "uplink" symbols, or are "uplink" symbols (denoted as "U"), "downlink" symbols (denoted as "D") and "flexible" symbol (denoted as "X"). Only downlink signals can be sent in the "D" symbols, and only uplink signals can be sent in the "U" symbols. Downlink signals or uplink signals can be sent in the "X" symbols. For example, the NR system defines different slot formats in Table 4.3.2-3 of the communication protocol TS 38.211. Each slot format defines which OFDM symbols in the slots are "D" symbols, "X" symbols or "U" symbols.

In order to reduce the impact of OTDOA positioning on data communication, the NR system needs to support flexible configuration of which "downlink" symbols or "flexible" symbols of the slot symbols can or cannot be configured to send PRSs. For example, the first 2 or 3 downlink OFDM symbols in a slot are usually configured to send PDCCHs. In the configuration of PRS symbols, no PRS is sent on the first 2 or 3 downlink OFDM symbols.

The embodiments of the present application provide the following two PRS OFDM symbol configuration methods to configure the symbols for sending PRSs in PRS slots.

PRS OFDM Symbol Configuration Method 1.

A bitmap is used as the symbol configuration information in the PRS slot to indicate which symbols can be configured to send PRSs. The bitmap can be a parameter with a length of at least $N_{symble}^{slot}$ bits ($N_{symble}^{slot}$ is the number of OFDM symbols in each slot). Each bit corresponds to an OFDM symbol. The different values of bits indicate whether the corresponding OFDM symbols are configured to send PRSs. For example, only when the bit value is "1", the "D" symbols or the "X" symbols corresponding to the bit are configured to send PRS.

Together with the slot format, the method provides a simple and flexible method to indicate the OFDM symbols configured to send PRSs in slots.

PRS OFDM Symbol Configuration Method 2.

OFDM symbols configured to send PRSs are listed through a tabulation method. The list includes N (N is an integer greater than or equal to 1) PRS symbol configuration indexes, and each PRS symbol configuration index is configured to indicate the symbols for sending PRSs in PRS slots. A PRS symbol configuration index in the list may be used as symbol configuration information in PRS slots to indicate the OFDM symbols configured to send PRSs. A PRS symbol configuration index may be a parameter with a length of at least $\log_2(N)$ bits, and N is the number of supported configurations, namely the number of "PRS symbol configuration indexes", and N is an integer greater than or equal to 1. Table 3 exemplarily shows an example of adopting a parameter with a length of 3 bits to support 8 configurations.

TABLE 3

Symbol configuration information in PRS slots

| PRS symbol configuration index | PRS OFDM symbols in slots | Notes |
|---|---|---|
| 0 | All "D" symbols in time slots | Default configuration |
| 1 | All "D" symbols and "X" symbols in slots | |
| 2 | All "D" symbols except the first 2 symbols in slots | Reserve the first 2 downlink symbols in slots to support data communication |
| 3 | All "D" symbols and "X" symbols except the first 2 symbols in slots | Reserve the first 2 downlink symbols and the "X" symbols in slots to support data communication |
| 4 | Reserved | |
| 5 | Reserved | |
| 6 | Reserved | |
| 7 | Reserved | |

In Table 3, the PRS symbol configuration indexes are used as the symbol configuration information in the PRS slots and configured to indicate which OFDM symbols in the slots are configured to send PRSs.

Figure 3:
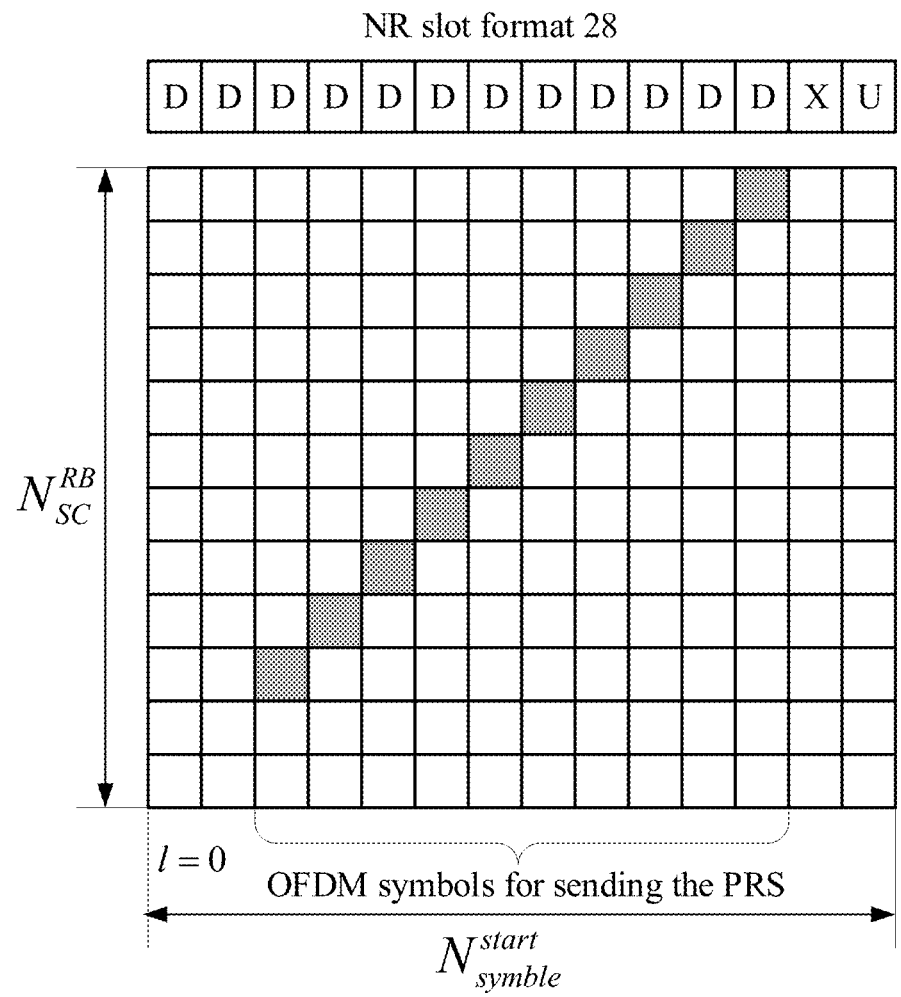
FIG. 3 is a schematic diagram of PRS symbol configuration provided by an embodiment of the present application.

FIG. 3 shows an example of configuring PRS OFDM symbols in slots through the configuration parameters given in Table 3. In the example, it is assumed that an NR slot format with the configuration index of 28 in the table 4.3.2-3 in the communication protocol TS 38.211 is adopted. In this format, the first 12 OFDM symbols are "D" symbols, and the last two OFDM symbols are an "X" symbol and a "U" symbol. The PRS symbol configuration index 2 in Table 3 is adopted and indicates that the first two "D" symbols are not configured to send PRSs, that is, the $3^{rd}$ to $12^{th}$ "D" symbols can be configured to send PRSs. It is assumed that the PRS RE density configuration parameter $c_{PRS}=1$, only one PRS RE in each PRS RB (each PRS RB contains $N_{SC}^{RB}$ REs) is configured to send PRSs, that is, as shown in FIG. 3, only one PRS RE on each symbol of the 3rd to 12th OFDM symbols is configured to send PRSs, and the REs configured to send the PRSs are filled in gray in FIG. 3.

Figure 4:
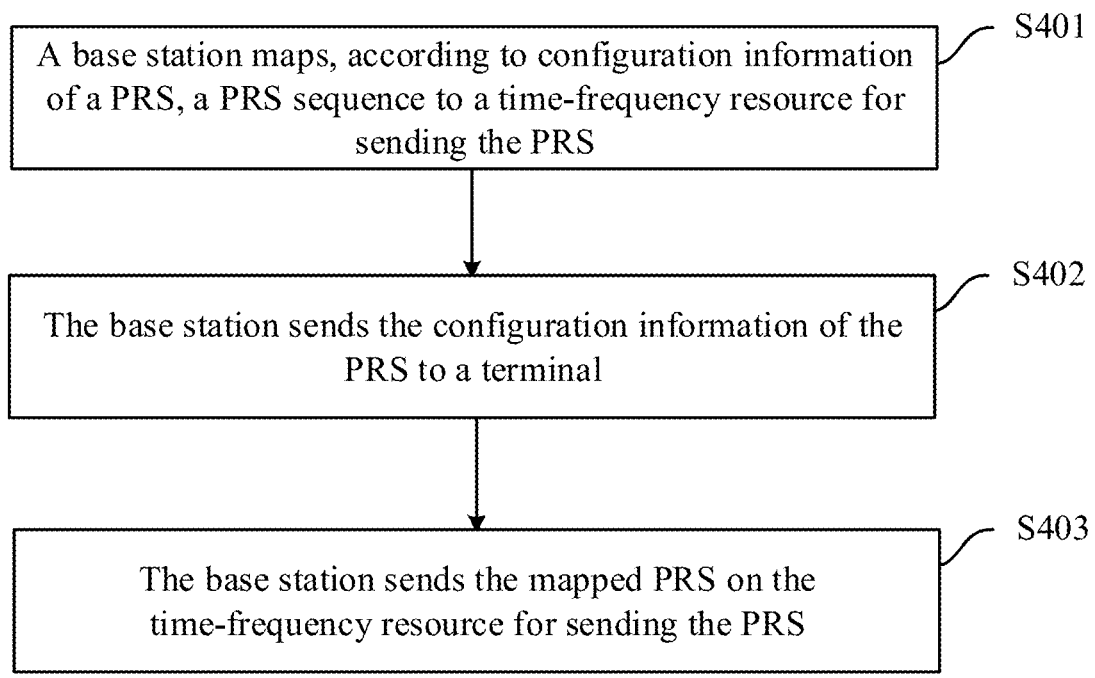
FIG. 4 is a schematic diagram of a process for sending a PRS provided by an embodiment of the present application.

Based on the above description, FIG. 4 shows a schematic diagram of a PRS sending process provided by an embodiment of the present application.

As shown in FIG. 4. The process can be executed on a base station side, and the process may include the following steps.

S401: a base station maps, according to configuration information (or a configuration parameter) of a PRS, a PRS sequence to a time-frequency resource for sending the PRS.

S402: the base station sends the configuration information of the PRS to a terminal.

In this step, In one embodiment, the base station may send the configuration information of the PRS to the terminal through signaling.

S403: the base station sends the mapped PRS on the time-frequency resource for sending the PRS.

The execution order of the steps in the above process is only an example, and the embodiment of the present application is not limited to the order.

The base station may send the configuration information of the PRS to the terminal, thus the terminal can determine a transmission resource of the PRS according to the configuration information of the PRS to receive the PRS on a corresponding resource.

As an example, in a possible implementation, the configuration information of the PRS may include a PRS RE density configuration parameter, and the meaning of the PRS RE density configuration parameter may refer to the foregoing embodiments and is not described in detail herein.

As an example, in a possible implementation, the configuration information of the PRS may include PRS frequency domain resource indication information. The PRS frequency domain resource indication information may include the start of the downlink resource grid, the start of the PRS bandwidth, the PRS bandwidth, the PRS amplitude scaling and PRS RE frequency shift indication information, and the PRS RE frequency shift indication information may include a sequence number of symbols adopted by the PRS, the sequence identity of the PRS and the PRS RE density configuration parameter. The explanation of the above parameters may refer to the foregoing embodiments, which is not described in detail herein.

As an example, in a possible implementation, the configuration information of the PRS may include PRS time domain resource indication information, and the PRS time domain resource indication information includes slot configuration information in PRS subframes and/or symbol configuration information in PRS slots, and the slot configuration information in the PRS subframes is configured to indicate slots for sending the PRS in the PRS subframes, and the symbol configuration information in the PR slots is configured to indicate symbols for sending the PRS in the PRS slots. The relevant parameters in the above PRS time domain resource indication information may refer to the description of the foregoing embodiments, which is not described in detail herein.

During specific implementation, the base station may firstly generate a pseudo-random sequence c(m) which is related to the PRS RE density configuration parameter $c_{PRS}$ and a size of the downlink resource grid; and then the base station initializes an initial value of the pseudo-random sequence and generates a PRS sequence based on the pseudo-random sequence. The PRS sequence may be generated according to the pseudo-random sequence, a size of the downlink resource grid and the PRS RE density configuration parameter. The specific implementation method of the process may refer to the foregoing embodiment, which is not described in detail herein.

In S401, the base station may map the PRS sequence to the time-frequency resource for sending the PRS according to the resource mapping method described in the foregoing embodiments and the configuration information of the PRS.

Figure 5:
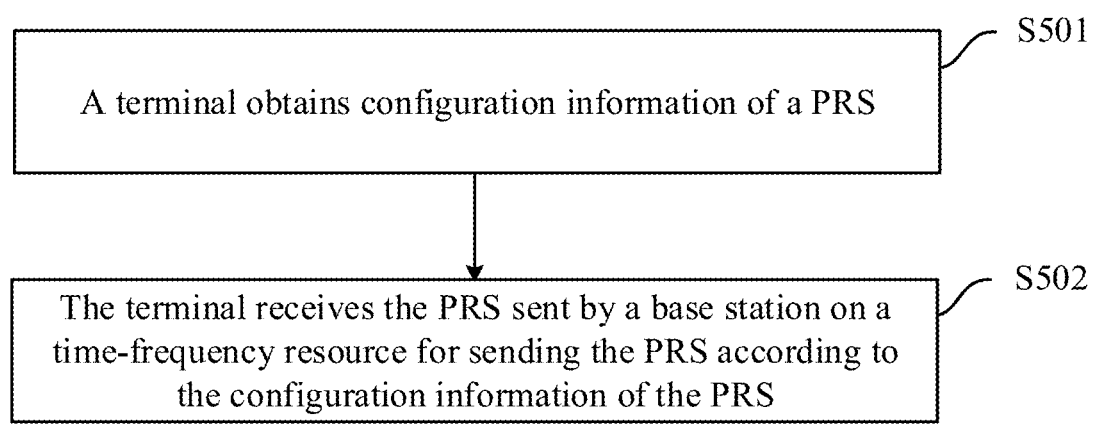
FIG. 5 is a schematic diagram of a process for receiving a PRS provided by an embodiment of the present application.

FIG. 5 is a schematic diagram of a PRS receiving process provided by an embodiment of the present application. The process may be implemented on a terminal side. As shown in the figure, the process may include the following steps.

S501: a terminal obtains configuration information of a PRS.

S502: the terminal receives the PRS sent by a base station on a time-frequency resource for sending the PRS according to the configuration information of the PRS.

In this step, the terminal may determine the time-frequency resource for sending the PRS according to the configuration information of the PRS, and receive the PRS sent by the base station on the time-frequency resource for sending the PRS.

In one embodiment, the involved configuration information of the PRS, the related description of the PRS sent by the base station, and a sending method may refer to the foregoing embodiments and are not described in detail herein.

Based on the same technical concept, an embodiment of the present application further provides a base station which can implement functions of the base station side in the foregoing embodiment.

Figure 6:
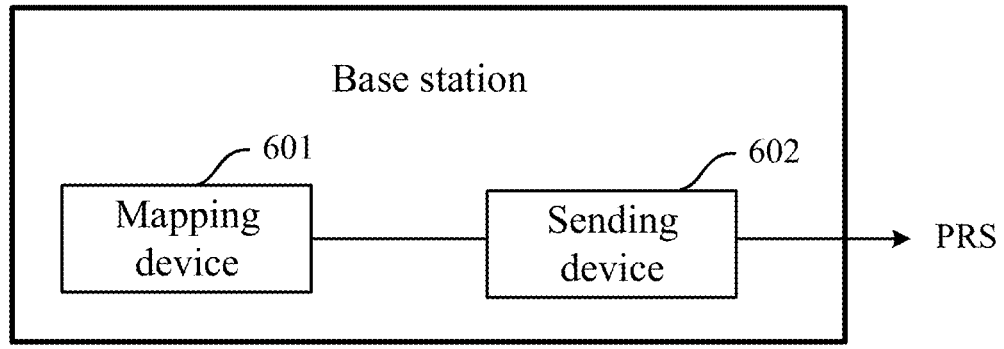
FIG. 6 is a schematic structural diagram of a base station provided by an embodiment of the present application.

FIG. 6 is a schematic structural diagram of a base station provided in an embodiment of the present application. The base station may include: a mapping device 601 and a sending device 602.

The mapping device 601 is configured to map a PRS sequence to a time-frequency resource for sending the PRS according to configuration information of the PRS; and the sending device 602 is configured to send the configuration information of the PRS to a terminal, and send the mapped PRS on the time-frequency resource for sending the PRS.

In one embodiment, the involved configuration information of the PRS, the related description of the PRS sent by the base station, and a sending method may refer to the foregoing embodiments and are not described in detail herein.

Based on the same technical concept, an embodiment of the present application further provides a terminal which can implement functions of the terminal side in the foregoing embodiment.

Figure 7:
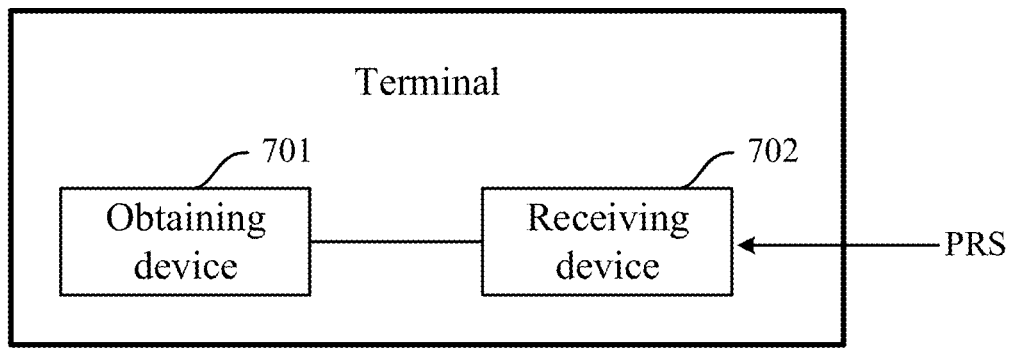
FIG. 7 is a schematic structural diagram of a base station provided by another embodiment of the present application.

FIG. 7 is a schematic structural diagram of a terminal provided in an embodiment of the present application. The terminal may include: an obtaining device 701 and a receiving device 702.

The obtaining device 701 is configured to obtain configuration information of a PRS; and the receiving device 702 is configured to receive the PRS sent by a base station on a time-frequency resource for sending the PRS according to the configuration information of the PRS.

The involved configuration information of the PRS, the relevant description of the PRS sent by the base station, and the sending method may refer to the foregoing embodiments and are not described in detail herein.

Figure 8:
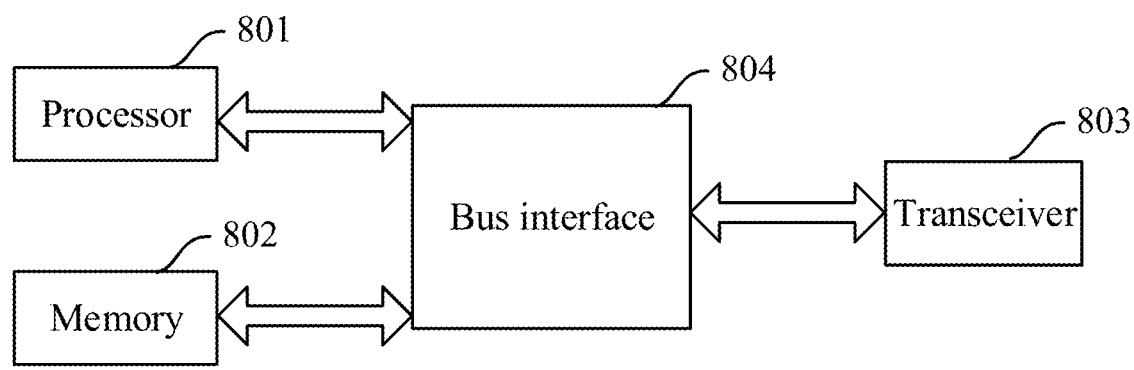
FIG. 8 is a schematic structural diagram of user equipment provided by an embodiment of the present application.

FIG. 8 is a schematic structural diagram of a base station provided by an embodiment of the present application. As shown in the figure, the base station may include: a processor 801, a memory 802, a transceiver 803 and a bus interface.

The processor 801 is configured to manage a bus architecture and general processing, and the memory 802 can store data used by the processor 801 during operation execution. The transceiver 803 is configured to receive and sending data under the control of the processor 801.

The bus architecture may include any number of interconnected buses and bridges and is In one embodiment formed by linking various circuits of one or more processors represented by the processor 801 and memories represented by the memory 802. The bus architecture can also link various other circuits such as peripheral equipment, voltage stabilizers and power management circuits, which are well-known in the art and therefore are not further described herein. The bus interface provides an interface. The processor 801 is configured to manage the bus architecture and general processing, and the memory 802 can store data used by the processor 801 during operation execution.

The process disclosed in the embodiments of the present application may be applied to the processor 801 or implemented by the processor 801. In the implementation process, the steps of the signal processing flow can be completed by hardware integrated logic circuits in the processor 801 or instructions in the form of software. The processor 801 may be a general-purpose processor, a digital signal processor, an application specific integrated circuit, a field programmable gate array or other programmable logic devices, a discrete gate or transistor logic device, or a discrete hardware component, and can implement or execute the methods, steps, and logical block diagrams disclosed in the embodiments of the present application. The general-purpose processor may be a microprocessor or any conventional processor. The steps of the method disclosed in the embodiments of the present application may be directly executed and completed by a hardware processor, or executed and completed by a combination of hardware and software devices in the processor. The software device may be located in a mature storage medium in the field such as a random access memory, a flash memory, a read-only memory, a programmable read-only memory, an electrically erasable programmable memory or a register. The storage medium is located in the memory 802, and the processor 801 reads information in the memory 802 and completes the steps of the signal processing flow in combination with hardware thereof.

In one embodiment, the processor 801 is configured to read a program in the memory 802 and executing the aforementioned PRS transmission process implemented by the base station side.

Based on the same technical concept, an embodiment of the present application further provides a terminal which can implement the functions of the terminal side in the foregoing embodiments.

Figure 9:
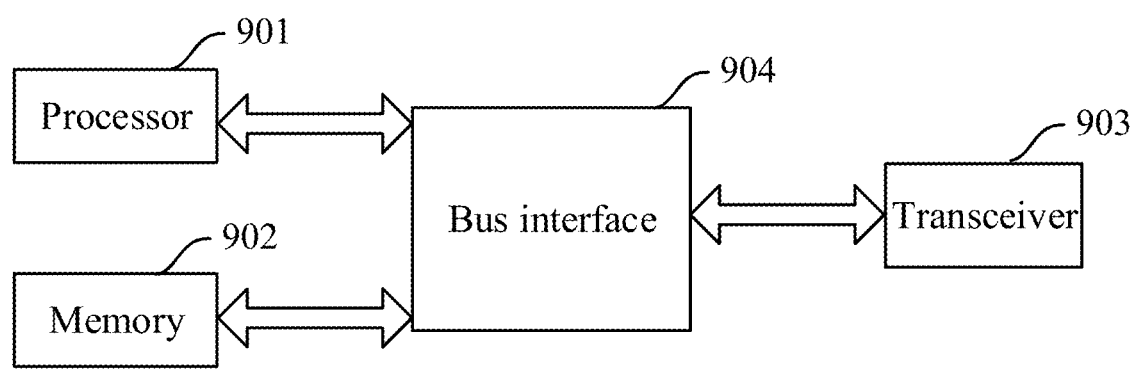
FIG. 9 is a schematic structural diagram of user equipment provided by another embodiment of the present application.

FIG. 9 is a schematic structural diagram of a terminal provided by an embodiment of the present application. As shown in the figure, the terminal may include: a processor 901, a memory 902, a transceiver 903 and a bus interface.

The processor 901 is configured to manage a bus architecture and general processing, and the memory 902 can store data used by the processor 901 during operation execution. The transceiver 903 is configured to receive and send data under the control of the processor 901.

The bus architecture may include any number of interconnected buses and bridges and is In one embodiment formed by linking various circuits of one or more processors represented by the processor 901 and memories represented by the memory 902. The bus architecture can also link various other circuits such as peripheral equipment, voltage stabilizers and power management circuits, which are well-known in the art and therefore are not further described herein. The bus interface provides an interface. The processor 901 is configured to manage the bus architecture and general processing, and the memory 902 can store data used by the processor 901 during operation execution.

The process disclosed in the embodiments of the present application may be applied to the processor 901 or implemented by the processor 901. In the implementation process, the steps of the signal processing flow can be completed by hardware integrated logic circuits in the processor 901 or instructions in the form of software. The processor 901 may be a general-purpose processor, a digital signal processor, an application specific integrated circuit, a field programmable gate array or other programmable logic devices, a discrete gate or transistor logic device, or a discrete hardware component, and can implement or execute the methods, steps, and logical block diagrams disclosed in the embodiments of the present application. The general-purpose processor may be a microprocessor or any conventional processor. The steps of the method disclosed in the embodiments of the present application may be directly executed and completed by a hardware processor, or executed and completed by a combination of hardware and software devices in the processor. The software device may be located in a mature storage medium in the field such as a random access memory, a flash memory, a read-only memory, a programmable read-only memory, an electrically erasable programmable memory or a register. The storage medium is located in the memory 902, and the processor 901 reads information in the memory 902 and completes the steps of the signal processing flow in combination with hardware thereof.

In one embodiment, the processor 901 is configured to read a program in the memory 902 and executing the aforementioned PRS transmission process implemented by the terminal side.

Based on the same technical concept, an embodiment of the present application further provides a computer-readable storage medium. The computer-readable storage medium stores computer-executable instructions, and the computer-executable instructions are configured to enable a computer to execute a process executed by a base station in the foregoing embodiments.

The present application is described with reference to flowcharts and/or block diagrams of methods, equipment (systems) and computer program products according to embodiments of the present application. It should be understood that each process and/or block in the flowcharts and/or the block diagrams, and the combination of processes and/or blocks in the flowcharts and/or the block diagrams can be realized by computer program instructions. These computer program instructions can be supplied to a processor of a general-purpose computer, a special-purpose computer, an embedded processor or other programmable data processing equipment to generate a machine, and thus the instructions executed by the processor of the computer or other programmable data processing equipment can generate a device for implementing the functions specified in one or more processes in the flowcharts and/or one block or more in the block diagrams.

These computer program instructions may also be stored in a computer-readable memory which can direct a computer or other programmable data processing equipment to operate in a specific manner, so that the instructions stored in the computer-readable memory generate a manufactured article including an instruction device, and the instruction device implements the functions specified in one or more processes in the flowcharts and/or one or more blocks in the block diagrams.

These computer program instructions may also be loaded on a computer or other programmable data processing equipment, thus a series of operation steps are executed on the computer or other programmable equipment to conduct computer-implemented processing, and then the instructions executed on the computer or other programmable equipment provide steps for implementing the functions specified in one or more processes in the flowcharts and/or one or more blocks in the block diagrams.

The invention claimed is:

1. A method for transmitting a positioning reference signal, comprising:
   mapping, by a base station, according to configuration information of a positioning reference signal (PRS), a PRS sequence to a time-frequency resource for sending the PRS;
   sending, by the base station, the configuration information of the PRS to a terminal; and
   sending, by the base station, a mapped PRS on the time-frequency resource for sending the PRS;
   wherein the subcarrier spacing of PRSs is $\Delta f_{PRS}=15\times 2^{\mu}$ kHz, and µ is equal to one of 0, 1, 2 or 3.

2. The method according to claim 1, wherein the configuration information of the PRS comprises a PRS resource element (RE) density configuration parameter, and the PRS RE density configuration parameter is configured to indicate a quantity of REs for sending the PRS in PRS resource blocks (RB); or
   the configuration information of the PRS comprises PRS frequency domain resource indication information, and the PRS frequency domain resource indication information comprises a start of a downlink resource grid, a start of a PRS bandwidth, the PRS bandwidth, PRS amplitude scaling and PRS RE frequency shift indication information; or
   the configuration information of the PRS comprises PRS time domain resource indication information, and the PRS time domain resource indication information comprises slot configuration information in PRS subframes and/or symbol configuration information in PRS slots; wherein, the slot configuration information in the PRS subframes is configured to indicate slots for sending the PRS in the PRS subframes, and the symbol configuration information in the PRS slots is configured to indicate symbols for sending the PRS in the PRS slots.

3. The method according to claim 2, wherein a bitmap serves as the slot configuration information in the PRS subframes, and the bitmap comprises $2^{\mu}$ a bits, each bit corresponds to a slot in the PRS subframes; when the bits in the bitmap are set to a specified value, the slots corresponding to the bits set to the specified value are configured to send the PRS; wherein is equal to one of 0, 1, 2, 3 and 4; or
   a bitmap serves as the symbol configuration information in the PRS slots, the bitmap comprises $N_{symble}^{slot}$ bits, each bit corresponds to a symbol in the PRS slots, when the bits in the bitmap are set to a specified value, the symbols corresponding to the bits set to the specified value are configured to send the PRS, wherein $N_{symble}^{slot}$ represents a quantity of symbols in a slot; or
   the symbol configuration information in the PRS slots is a PRS symbol configuration index in a symbol list, the symbol list comprises N PRS symbol configuration indexes, each PRS symbol configuration index is configured to indicate symbols for sending the PRS in the PRS slots, and a length of the symbol list is $\log_2(N)$ bits, wherein N is an integer greater than or equal to 1.

4. The method according to claim 2, wherein the PRS RE frequency shift indication information comprises a sequence number of symbols adopted by the PRS, a PRS sequence identity and a PRS RE density configuration parameter.

5. The method according to claim 1, wherein the PRS sequence is mapped to the frequency domain resource for sending the PRS according to a following formula:

$$a_{k,l}^{(p,\mu)} = \beta_{PRS}\gamma_{l,n_{s,f}}(n'); \text{ wherein,}$$

$$k = (n + N_{PRS}^{start,\mu} + N_{grid,DL}^{start,\mu}) \times N_{SC}^{RB} + \frac{N_{SC}^{RB}}{c_{PRS}}k' + \upsilon_{shift};$$

$$\upsilon_{shift} = (l + N_{ID}^{PRS})\mod\left(\frac{N_{SC}^{RB}}{c_{PRS}}\right);$$

$$n' = c_{PRS} \times (n + N_{PRS}^{start,\mu}) + k';$$

$$n = 0, 1, \ldots, N_{RB}^{PRS} - 1;$$

$$k' = 0, 1, \ldots, c_{PRS} - 1;$$

wherein, a reference of k is a subcarrier 0 in a common resource block 0 in a common resource block grid, represents a start of a downlink resource grid, $N_{PRS}^{start,\mu}$ represents a start of a PRS bandwidth, $N_{RB}^{PRS}$ represents the PRS bandwidth, $\beta_{PRS}$ represents PRS amplitude scaling, $v_{shift}$ represents PRS RE frequency shift, l represents a sequence number of orthogonal frequency division multiplexing (OFDM) symbols adopted by the PRS, $N_{ID}^{PRS}$ represents a PRS sequence identity, $N_{SC}^{RB}$ represents a quantity of subcarriers in each PRS RB, $c_{PRS}$ represents a PRS RE density configuration parameter, and $\gamma_{l,n_{s,f}}(n')$ represents the PRS sequence with an OFDM symbol sequence number of l in a slot $n_{s,f}$.

6. The method according to claim 5, wherein the PRS sequence is generated according to a pseudo-random sequence, a size of the downlink resource grid, and the PRS RE density configuration parameter; and
an initial value of the pseudo-random sequence is generated according to a sequence number of slots adopted by the PRS, a sequence number of symbols in corresponding slots, and a PRS sequence identity.

7. The method according to claim 6, wherein the initial value of the pseudo-random sequence is:

$$c_{init} = \left\{ 2^{28+\mu} \times \left\lfloor \frac{N_{ID}^{PRS}}{1024} \right\rfloor + 2^{10} \times (14 \times (n_{s,f}^{\mu} + 1) + l + 1) \times (N_{ID}^{PRS} \bmod 1024 + 1) + (N_{ID}^{PRS} \bmod 1024) \right\} \bmod 2^{31};$$

wherein, $c_{init}$ represents the initial value of the pseudo-random sequence; $n_{s,f}^{\mu}$ represents a slot sequence number within a radio frame for subcarrier spacing configuration $\mu$, $\mu$ represents a subcarrier spacing configuration parameter, and $\mu \in \{0,1,2,3,4\}$; l represents a sequence number of OFDM symbols within a slot $n_{s,f}^{\mu}$; and $N_{ID}^{PRS}$ represents the PRS sequence identity.

8. The method according to claim 6, wherein the initial value of the pseudo-random sequence is:

$c_{init} = (2^{16} \times (14 \times n_{s,f}^{\mu} + l + 1) \times (2N_{ID}^{PRS} + 1) + N_{ID}^{PRS}) \bmod 2^{31};$ wherein, $c_{init}$ represents the initial value of the pseudo-random sequence; $n_{s,f}^{\mu}$ represents a slot sequence number within a radio frame for subcarrier spacing configuration $\mu$, $\mu$ represents a subcarrier spacing configuration parameter, and $\mu \in \{0,1, 2,3,4\}$; l represents a sequence number of OFDM symbols within a slot $n_{s,f}^{\mu}$; and $N_{ID}^{PRS}$ represents the PRS sequence identity.

9. A method for transmitting a positioning reference signal, comprising:
obtaining, by a terminal, configuration information of a positioning reference signal (PRS); and
receiving, by the terminal, the PRS on a time-frequency resource for sending the PRS according to the configuration information of the PRS, wherein the PRS is sent by a base station;
wherein the subcarrier spacing of PRSs is $\Delta f_{PRS} = 15 \times 2^{\mu}$ kHz, and $\mu$ is equal to one of 0, 1, 2 or 3.

10. The method according to claim 9, wherein the configuration information of the PRS comprises a PRS resource element (RE) density configuration parameter, and the PRS RE density configuration parameter is configured to indicate a quantity of REs for sending the PRS in PRS resource blocks (RB); or the configuration information of the PRS comprises PRS frequency domain resource indication information, and the PRS frequency domain resource indication information comprises a start of a downlink resource grid, a start of a PRS bandwidth, the PRS bandwidth, PRS amplitude scaling and PRS RE frequency shift indication information; or
the configuration information of the PRS comprises PRS time domain resource indication information, and the PRS time domain resource indication information comprises slot configuration information in PRS subframes and/or symbol configuration information in PRS slots;
wherein, the slot configuration information in the PRS subframes is configured to indicate slots for sending the PRS in the PRS subframes, and the symbol configuration information in the PRS slots is configured to indicate symbols for sending the PRS in the PRS slots.

11. The method according to claim 10, wherein a bitmap serves as the slot configuration information in the PRS subframes, and the bitmap comprises $2^{\mu}$ bits, each bit corresponds to a slot in the PRS subframes, when the bits in the bitmap are set to a specified value, the slots corresponding to the bits set to the specified value are configured to send the PRS; and $\mu$ is equal to one of 0, 1, 2, 3 and 4; or
a bitmap serves as the symbol configuration information in the PRS slots, the bitmap comprises $N_{symble}^{slot}$ bits, each bit corresponds to a symbol in the PRS slots, when the bits in the bitmap are set to a specified value, the symbols corresponding to the bits set to the specified value are configured to send the PRS, wherein $N_{symble}^{slot}$ represents a quantity of symbols in a slot; or
the symbol configuration information in the PRS slots is a PRS symbol configuration index in a symbol list, the symbol list comprises N PRS symbol configuration indexes, each PRS symbol configuration index is configured to indicate symbols for sending the PRS in the PRS slots, and a length of the symbol list is $\log_2(N)$ bits, and N is an integer greater than or equal to 1.

12. The method according to claim 10, wherein the PRS RE frequency shift indication information comprises a sequence number of symbols adopted by the PRS, a PRS sequence identity and a PRS RE density configuration parameter.

13. The method according to claim 9, wherein the PRS sequence is mapped to the frequency domain resource for sending the PRS according to a following formula:

$$a_{k,l}^{(p,\mu)} = \beta_{PRS} \gamma_{l,n_{s,f}}(n'); \text{ wherein,}$$

$$k = (n + N_{PRS}^{start,\mu} + N_{grid,DL}^{start,\mu}) \times N_{SC}^{RB} + \frac{N_{SC}^{RB}}{c_{PRS}} k' + v_{shift};$$

$$v_{shift} = (l + N_{ID}^{PRS}) \bmod \left( \frac{N_{SC}^{RB}}{c_{PRS}} \right);$$

$$n' = c_{PRS} \times (n + N_{PRS}^{start,\mu}) + k';$$

$$n = 0, 1, \ldots, N_{RB}^{PRS} - 1;$$

$$k' = 0, 1, \ldots, c_{PRS} - 1;$$

wherein, a reference of k is a subcarrier 0 in a common resource block 0 in a common resource block grid, $N_{grid,DL}^{start,\mu}$ represents a start of a downlink resource grid, $N_{PRS}^{start,\mu}$ represents a start of a PRS bandwidth, $N_{RB}^{PRS}$ represents the PRS bandwidth, $\beta_{PRS}$ represents PRS amplitude shift scaling, $v_{shift}$ represents PRS RE frequency shift, l represents a sequence number of orthogonal frequency division multiplexing (OFDM) symbols adopted by the PRS, $N_{ID}^{PRS}$ represents a PRS sequence identity, $N_{SC}^{RB}$ represents a quantity of subcarriers in each PRS RB, $c_{PRS}$ represents a c PRS RE density configuration parameter, and $\gamma_{l,n_{s,f}}(n')$ represents the PRS sequence with an OFDM symbol sequence number of l in a slot $n_{s,f}$.

14. The method according to claim 13, wherein the PRS sequence is generated according to a pseudo-random sequence, a size of the downlink resource grid, and the PRS RE density configuration parameter; and an initial value of the pseudo-random sequence is generated according to a sequence number of slots adopted by the PRS, a sequence number of symbols in corresponding slots, and a PRS sequence identity.

15. The method according to claim 14, wherein the initial value of the pseudo-random sequence is:

$$c_{init} = \left\{ 2^{28+\mu} \times \left\lfloor \frac{N_{ID}^{PRS}}{1024} \right\rfloor + 2^{10} \times (14 \times (n_{s,f}^{\mu} + 1) + l + 1) \times (N_{ID}^{PRS} \bmod 1024 + 1) + (N_{ID}^{PRS} \bmod 1024) \right\} \bmod 2^{31};$$

wherein, $c_{init}$ represents the initial value of the pseudo-random sequence; $n_{s,f}^{\mu}$ represents a slot sequence number within a radio frame for subcarrier spacing configuration $\mu$, $\mu$ represents a subcarrier spacing configuration parameter, and $\mu \in \{0,1,2,3,4\}$; l represents a sequence number of OFDM symbols within a slot $n_{s,f}^{\mu}$; and $N_{ID}^{PRS}$ represents the PRS sequence identity.

16. The method according to claim 14, wherein the initial value of the pseudo-random sequence is:

$$c_{init} = (2^{16} \times (14 \times n_{s,f}^{\mu} + l + 1) \times (2N_{ID}^{PRS} + 1) + N_{ID}^{PRS}) \bmod 2^{31};$$

wherein, $c_{init}$ represents the initial value of the pseudo-random sequence; $n_{s,f}^{\mu}$ represents a slot sequence number within a radio frame for subcarrier spacing configuration $\mu$, $\mu$ represents a subcarrier spacing configuration parameter, and $\mu \in \{0,1,2,3,4\}$; l represents a sequence number of OFDM symbols within a slot $n_{s,f}^{\mu}$; and $N_{ID}^{PRS}$ represents the PRS sequence identity.

17. A base station, comprising: a processor and a memory; wherein the processor is configured to read a program in the memory to perform the method according to claim 1.

18. A terminal, comprising: a processor and a memory; wherein the processor is configured to read a program in the memory to perform the method according to claim 9.

* * * * *